(12) United States Patent
Barsade et al.

(10) Patent No.: US 8,135,620 B2
(45) Date of Patent: Mar. 13, 2012

(54) NETWORK BANNER ADVERTISEMENT SYSTEM AND METHOD

(75) Inventors: Jonathan Barsade, New Haven, CT (US); Steven Y. Cho, Sherman Oaks, CA (US); Adam Zell, Los Altos, CA (US)

(73) Assignee: Google Inc., Mountain View, CA (US)

( * ) Notice: Subject to any disclaimer, the term of this patent is extended or adjusted under 35 U.S.C. 154(b) by 3685 days.

(21) Appl. No.: 10/113,114

(22) Filed: Mar. 29, 2002

(65) Prior Publication Data

US 2002/0169670 A1    Nov. 14, 2002

Related U.S. Application Data

(63) Continuation-in-part of application No. 09/867,223, filed on May 29, 2001, now abandoned.

(60) Provisional application No. 60/306,887, filed on Jul. 23, 2001, provisional application No. 60/317,142, filed on Sep. 6, 2001, provisional application No. 60/322,473, filed on Sep. 17, 2001, provisional application No. 60/330,990, filed on Nov. 6, 2001, provisional application No. 60/340,864, filed on Dec. 19, 2001, provisional application No. 60/279,707, filed on Mar. 30, 2001.

(51) Int. Cl.
  *G06F 21/00*   (2006.01)
(52) U.S. Cl. ............... 705/14.73; 705/14.59; 715/803; 715/808
(58) Field of Classification Search ........... 705/14.4, 705/14.49, 14.72, 14.73
  See application file for complete search history.

(56) References Cited

U.S. PATENT DOCUMENTS

| | | | |
|---|---|---|---|
| 5,621,201 A | 4/1997 | Langhans et al. | |
| 5,708,422 A | 1/1998 | Blonder et al. | |
| 6,011,537 A * | 1/2000 | Slotznick | 715/733 |
| 6,164,528 A | 12/2000 | Hills et al. | |
| 6,237,022 B1 * | 5/2001 | Bruck et al. | 709/201 |
| 6,647,376 B1 | 11/2003 | Farrar et al. | |
| 6,744,452 B1 * | 6/2004 | McBrearty et al. | 715/853 |
| 6,763,379 B1 * | 7/2004 | Shuster | 709/224 |
| 6,879,710 B1 | 4/2005 | Hinoue et al. | |
| 6,909,837 B1 * | 6/2005 | Unger | 386/68 |
| 6,973,441 B1 | 12/2005 | Jaggi | |
| 7,007,072 B1 * | 2/2006 | Guha | 709/216 |
| 7,007,240 B1 * | 2/2006 | Anderson et al. | 715/790 |
| 7,076,439 B1 | 7/2006 | Jaggi | |
| 7,233,929 B1 | 6/2007 | Lingle et al. | |
| 7,406,427 B1 | 7/2008 | Guyan et al. | |
| 7,409,355 B1 | 8/2008 | Guyan et al. | |
| 2002/0019831 A1 * | 2/2002 | Wade | 707/500 |

\* cited by examiner

*Primary Examiner* — Yehdega Retta
(74) *Attorney, Agent, or Firm* — Fish & Richardson P.C.

(57) ABSTRACT

A network advertising system and method includes a network server, a computer user, an electronic banner advertisement (BA) file, multiple web page files, a BA program, and a monitor. The BA is displayed on the monitor in a window of a browser program from about the point in time that a new web page is requested to about the point in time that the web page file corresponding to the new web page is downloaded onto the user computer and ready for viewing. The BA offers an advertising venue that will serve up a very discernible advertisement, uncluttered by other content that captivates the viewer's interest, at a point of time that a web (Internet or other network) surfer is willing and amenable to review additional data and information. This is typically a down-time, interstitial period, during a browser session. However, by displaying the advertisement as described, most web surfers will pay attention to the BA and the message that it is providing.

5 Claims, 16 Drawing Sheets

NETWORK BANNER ADVERTISEMENT SYSTEM AND METHOD

CROSS-REFERENCE TO EARLIER FILED APPLICATIONS

The present application claims the priority of and is a continuation in part of application Ser. No. 09/867,223 filed May 29, 2001 now abandoned, and claims the priority of provisional applications for patent Ser. No. 60/279,707 file Mar. 30, 2001, No. 60/306,887 filed Jul. 23, 2001, No. 60/317,142 filed Sep. 6, 2001, No. 60/322,473 filed Sep. 17, 2001, No. 60/330,990 filed Nov. 6, 2001, and No. 60/340,864 filed Dec. 19, 2001.

FIELD OF THE INVENTION

The present invention relates generally to a system and method of advertising on a network, and more specifically, to a system and method of generating a full or partial page banner advertisement during an Internet browser session.

BACKGROUND OF THE INVENTION

During the year 2000, companies spent approximately $8.2 billion in on-line advertising. Strictly online companies, such as PlanetRX, Boo.com, MotherEarth.com, WebVan, X.com, eToys, DrKoop.com, applied almost all of their capital towards on-line marketing campaigns for market education purposes, resulting, in some cases, in more than a $100 per customer acquisition cost. In many of these cases, the customers produced only a few dollars in return purchases for the companies. Consequently, about twenty web sites account for more than 80% of on-line advertising revenue. To maximize effectiveness, most of the advertising dollars were directed towards those web sites with the highest levels of traffic. For example, out of the more than 2,800 web sites that vied for advertising revenue, about 70% of on-line advertising revenue was generated by the top 10 web sites.

To date, traditional, non-e-commerce companies have not diverted significant finds towards on-line advertising. These companies have tended to spend their advertising funds in traditional advertising media, including print and broadcast. For example, in September 2000, the 10 largest U.S. companies spent less than $50 million (just over 3%) of a total of $1.6 billion spent in on-line marketing. Some companies such as GE, Boeing, and Citigroup, spent less than a million dollars each in on-line marketing.

One of the reasons that companies are reluctant to invest in on-line advertising is the lack of the apparent effectiveness of this advertising medium in generating return sales. The advertising banners included on most web pages are small and inconspicuous and are typically not readily discernible in a web page cluttered with graphics, texts and links. The conventional advertising banner is also generally undesirable to a viewer of a web page as it takes up space on the web page that the viewer would rather view without the banner, thereby forcing the surfer to: (i) pro-actively split his focus between the page s/he is interested in reviewing (the substantive web page) and the banner; and (ii) where possible, click out of the banner. Anyone surfing the web is undoubtedly familiar with those mind-numbing moments of staring aimlessly at the computer screen, momentarily shifting the glaze nervously to the bar at the bottom of the web browser, which is the only indication that indeed the computer system is trying to locate and serve-up (download) the requested page, praying that all the wait will not be in vain, and that an error message will not be the ultimate result. In 1998 alone, web surfers spent a total of 2.5 billion hours waiting for web pages to download[1]. A significant amount of the time it takes to download a web page can be due to the downloading of advertising banner(s) included in the web page rather than the downloading of the desired content of the web page.

[1]Business2.0. The average load time can range from 4 seconds per page (using DSL and broadband capabilities) to 7-8 seconds (when using standard 56 k dial up modem).

The traditional banner ad is also cumbersome to use since a web surfer that clicks on the ad is typically taken away from the main site where s/he was surfing, forcing her/him to reconstruct the main web-surfing session.

Companies are also reluctant to spend capital on on-line advertising because of the disadvantages it possesses as compared to traditional print and broadcast media advertising. In broadcast media, the ad is delivered in discrete program breaks, assuring the advertiser of the full attention of the viewer. In print media, advertising is typically measured in full, half and quarter page sizes, assuring the advertiser of an advertisement that is readily distinguishable from the surrounding content. In the on-line banners that are currently used, the advertising information, as measured in pixels, would take up less than 2% of a comparable printed page, and in many instances, much less than that. With their comparatively small size and lack of ability to capture a reader's interest, the conventional banner ad is not an effective advertising medium for the Internet.

U.S. Pat. No. 6,141,010 to Hoyle discloses a computer interface method and apparatus with targeted advertising. The method and apparatus provide an automatically upgradeable software application that includes targeted advertising. A software application includes a GUI that includes a display region used for banner advertising that is downloaded from the Internet periodically. The advertisement to be displayed to a computer user is related to software applications on the user's computer.

U.S. Pat. No. 6,216,112 to Fuller et al. discloses a method and system for offering and distributing software wherein advertisements are incorporated into the software product. The advertisements are stored in the random access memory of the computer whenever the software is invoked and are displayed before the software can be used. The advertisements are periodically refreshed by automatically accessing computer servers on the Internet and downloading and installing the advertisements on the hard disk of the computer.

U.S. Pat. No. 6,161,142 to Wolfe et al. discloses a system and method for delivering programmed music and targeted advertising messages to Internet based subscribers. The system includes software that relates advertising to musical content according to a subscriber's practices. The subscriber receives the programmed music and matched advertisements from the repository over the Internet.

Interstitials advertisements offer a unique branding opportunity, given that they are uncluttered by surrounding content. The attention of the end user is directed to the advertisement and the message that it conveys for those few seconds during which a first web page is being removed from a browser window and a requested second page is being downloaded into the browser window. However, the brief period of time during which the interstitial is available for viewing is oftentimes a drawback, as the end user may not have time to reflect and act upon the ad before it disappears, and the content of the target page appears.

U.S. Pat. No. 6,317,761, which issued Nov. 13, 2001 to Landsman et al., discloses a technique for downloading an advertisement to an end-user computer in a manner transparent to a user and for displaying the advertisement on an interstitial basis, in response to a click-stream generated by the user to move from one page to the next. Interstitial space refers to the time period between which a user requests a new web page and downloading of the content of the new web page is completed. The '761 patent discloses the embedding of an HTML tag into a referring web page, which tag causes the downloading and instantiation of an agent into the browser, which agent causes the polite and transparent downloading of advertising files into a browser cache and the subsequent playing of the advertisement media files through the browser on an interstitial basis. The '761 patent requires that the downloading of files and other processes be suspended in response to user navigation events during a browser session.

U.S. Pat. No. 6,314,451, which issued Nov. 6, 2001 to Landsman et al., discloses a technique for downloading advertisements to an end-user, in a manner transparent to the user, and for displaying the advertisement on an interstitial basis in response to a user generated click-stream. This technique requires the embedding of an HTML tag into a referring web page, which tag causes the downloading and instantiation of an agent into the browser. The tag also includes a web address that is a reference to an advertisement management system, which system selects the given advertisement that is to be downloaded, rather than having the selection of the advertisement, or its content, be embedded into the web content page. The '451 patent requires that the end-user computer dynamically write applet tags into the source page. This patent also requires that the script, which is written into the source page by the applet tags, cause the downloading of an agent from a network server, which agent, having an applet, requests the downloading of a predefined list of files. This system also requires that the downloading of files and other processes be suspended in response to user navigation events.

U.S. Pat. No. 5,737,619, which issued Apr. 7, 1998, U.S. Pat. No. 5,572,643, which issued Nov. 5, 1996, and U.S. Pat. No. 6,185,586, which issued Feb. 6, 2001, to Judson disclose the concept of embedding an advertisement, as an information object, into a web page in such a manner that it will be disregarded and remain hidden while the page is being displayed. Rather than being displayed, the information object is locally cached by the browser during execution of the code for the source page. Then during a transition initiated by user activation of a hyperlink to move to a next target page, the advertisement is accessed from cache and displayed until the target page is downloaded. Accordingly, the content of the advertisement must be embedded within and downloaded with the content of a source page. The Judson system requires that the advertisement and source page be loaded onto the same server.

Another available technology for displaying advertisements during browser sessions is referred to herein as the URL redirect technology, which is being used at the MSNBC.COM and SALON.COM websites, among others. The URL redirect employs the following steps. A user requests a certain URL by clicking on a predefined hyperlink on a browser window (page). The browser is redirected towards a new page, unrelated to the requested URL, which displays an advertisement on an interstitial basis. Upon conclusion of the display (or other predetermined criteria), the browser is directed to the requested URL. URL redirects are typically integrated and correlated with specific hyperlinks. Because it is not possible to predict which event will be used to unload the source page, interstitial redirect events cannot be preloaded, and not all unloading events will launch the interstitial event. Because the advertisement must be downloaded only after clicking on the related link, the interstitial data stream is downloaded only after clicking on the link, thus postponing downloading of the requested URL. The nature of the URL redirect technology is such that clicking on the browser "back" button will return the user to the interstitial event, and then back to the requested URL. The "back" button is rendered ineffective under the URL redirect technology.

Interstitial events, such as the display of advertisements during the time period in which a requested web page is downloaded from a network prior to viewing, may oftentimes not occur when the end-user requests a web page ("Target Page") that is unknown to the author of the originating web page ("Source Page") that the user was just viewing. This is due to security features typically implemented into web browsers. Such "unknown URL" events, as just described, typically occur under the following situations: 1) the end user does not click upon a URL that is placed in the form of a hyperlink within the Target Page and instead manually enters the URL into the address bar of web browser; 2) the user clicks on a link in a document that is extrinsic to the Target Page (for example, a hyperlink in a Word document or in an e-mail message); 3) the user clicks on a link that is in a frame that is external to that frame in which the Target Page is integrated; 4) the user clicks on a hyperlink that appears in the 'my favorite' web sites in one's browser; or 5) the user clicks on the browser's "refresh" button. Web page authors can typically control events when the web browser stays within a domain that is under their control or where the destination of a URL event can be predicted or controlled by the web page author, for example by the use of a hyperlink that is integrated into the web page. In the case of Unknown URL events, because the browser is directed towards a URL that is previously unknown to the author of the Source Page, control over interstitial events is lost the moment that the browser exits the Source Page towards the Target Page, so that interstitial advertisements, for example, cannot be displayed using known network advertising systems.

Moreover, with conventional interstitial advertisement systems, there is no method for retrieval of information provided in the interstitial when the user is moved onwards to the target web page, i.e., the user has no means for referring back to the message that appeared in the interstitial advertisement. While interstitial advertising has been applied to the webbrowsing environment, it has not yet been employed in an email environment in conjunction with HTML formatted e-mails, such as newsletters. To date, the distributors of bulk emails and newsletters have relied upon the integration of traditional banner ads into the body of the email for the purpose of generating ad revenue in conjunction with the distribution of the email. This methodology suffers from the known disadvantages of banner advertising, such as the reduced effective focus upon the ad, which is cluttered amongst the content of interest, loss of the advertisement from view once the end user scrolls down the e-mail.

Accordingly, a need remains for an on-line advertising system and method that overcomes the disadvantages of the known banner advertising systems. Such a system would provide increased banner advertisement content while not significantly increasing, and perhaps even decreasing, the amount of time it takes for a desired web page to download to a user computer.

SUMMARY OF THE INVENTION

The system and method of the invention seeks to overcome the disadvantages inherent in the conventional banner advertising systems and methods used on the Internet. The present system provides an advertising banner which content is clearly distinguishable from the content of a target requested web page. The banner ad of the invention is viewed between requested web pages, i.e., it is viewed during the time period in which a first web page is being removed from a browser window and a requested second web page is being downloaded onto a computer and ready for viewing in the browser window. Upon completion of the downloading of the requested web page, the advertising banner closes, recedes behind the requested web page, spawns off a new browser window behind the session of the requested page (pop-under window), maintains a position in front of the requested page or spawns off a new browser window in front of the session of the requested page (pop-up window). In either case, the banner ad of the invention assumes a secondary role as compared to the completely downloaded content of the requested page, so that an Internet user can view at least a major content of the requested web page.

In one embodiment, the banner ad is a full page banner ad (FPBA) that takes up at least a major portion of, or preferably at least almost the entire content of, a standard sized web page. In another embodiment, the banner ad is a partial page banner ad (PPBA) that takes up less than a major portion of the entire content of a standard sized web page. Since a web page can comprise one or more frames, the banner ad will generally comprise at least the entire content of a frame. The BA can occupy more than one frame of a single window. Depending upon the embodiment of the invention, the frame containing the banner ad will occupy a minor portion, a major portion or the entirety of a web page.

The banner ad may be downloaded a first time from an Internet server onto and stored in the memory of the computer of a web user (web surfer). Alternatively, the BA can be stored in a frame separate from of the same frame as the source web page and that of the requested web page or in a window different from the window of the requested web page. This download occurs as a background download, so that its occurrence will generally not significantly disrupt a surfer's viewing of a requested web page. The banner ad can be available for viewing immediately after its first download onto a user computer. Alternatively, it is served up from the computer's memory to a web browser and viewed during the time period that a web user is waiting for another requested page to download.

Because of the timing of its download and its serving up to the browser, the banner ad takes advantage of the time period during which the web surfer is an interested and captive audience, i.e., the period that occurs during downloading of a requested web page. During this period the web surfer is more open to possible diversions from his main surfing activities.

The system and method of the invention provides a non-disruptive advertisement that is quick, efficient and effective in delivering its message.

The banner ad software can include a visible progress bar indicating the status of delivery of a requested page, thereby providing a web surfer with an indication of the status of the download of the requested web page and confirming that his computer system is working concurrently on loading the requested page. The banner ad software could take information gathered from the browser software and from heuristics applied to incoming data streams in order to determine the level of progress made in downloading the requested page. The progress bar of the BA will incorporate data from the progress bar that is used by the Internet browser monitoring the progress of downloading of the requested page. Alternatively, the progress bar can obtain download status data also by evaluating the amount of data downloaded into the browser or by evaluating the amount of time that has elapsed since submittal of the request for the requested page. The BA progress bar may function when the BA is activated by web page changes that do not require a change of domains. In the case of a change of domains, the progress bar may be deactivated or appear in the form of an icon indicating that activity is taking place, but without a clear indication of the precise status of downloading of the requested web page. The BA program can be modified to incorporate features that enable the progress bar to be fully activated also during web page changes that occur in the transfer to a different domain. As used herein, the term "network data stream" refers to a content (information) stream of data bits, such as those which together comprise an Internet web page, that is not the intended advertisement data stream, which may also be referred to as an advertisement file.

The claimed banner ad (BA) system and method generally overcome many of the disadvantages of the known banner ads in that: (i) a BA can occupy approximately the entire space of the window of a browser session, except for the tool bars, for example, thus eliminating the undesirable effect that surrounding unwanted content has on the effectiveness of the advertisement; (ii) the claimed banner ad is served up effectively during a down-time (herein referred to as interstitial space or interstitial time), such as the time period between the serving up of a different requested page or when the web surfer is otherwise awaiting the down load of a requested page; (iii) clicking on the claimed banner ad may result in an independent browser session that will open up the advertising site, without disrupting the main surfing session; and/or (iv) the claimed banner ad permits the advertiser to provide a condensed and more appealing message that can integrate concise audio and video presentations utilizing flash technologies, or other such technologies, which presentations are not available in traditional banner ads that have size and environment constraints, and which do not conflict or otherwise interfere with the content of the main web page. Unlike the banner ad of the invention, conventional banner ads typically only include a simple graphic, text and/or a simple animation.

The BA of the invention can be located in the same window of a browser session in which a web user is awaiting downloading of a requested web page or it can be located in a different browser window, such as part of a separate browser session that is not the part of the browser session in which the web user is awaiting downloading of a requested web page. When located in the same windows, the BA and the requested web page can be in different frames of the same window or loaded into the same window in a sequential order. Therefore, another embodiment of the BA system provides for the downloading of an advertisement and a first requested web page into different frames of the same multi-frame window of a browser. When a second page is requested, it can be downloaded and displayed into yet another frame of the multi-frame window or stored in the memory of the computer for later display, either in one of the frames of the multi-frame window, or the browser program may eliminate the multiple frames reconstituting the browser window into a single frame window and load the second page into the single frame window. Alternatively, the second requested page can be downloaded and viewed in a window separate from the multi-frame window. Accordingly, one aspect of the invention provides a method of providing to a user computer connected to a network an information packet data stream, the computer having a processor, a memory connected to the processor for storing computer executable instructions, wherein the computer executable instructions include a browser program for the execution and display of data streams provided over a computer network, the method comprising the steps of:

requesting a first network data stream for display in a network browser session, wherein the first network data stream includes an activation code for initiating the downloading of an information packet data stream separate from or independent of the first network data stream;

creating a multi-frame window in a displayable browser session;

downloading a first network data stream from the network and loading it into a first frame of the multi-frame window; and downloading the information packet data stream into a second frame of the multi-frame window.

Specific embodiments of the invention include those wherein: a) the first frame is visible to the end-user and the second frame is not visible to the end-user until a URL event is activated; b) the information packet data stream ("IPDS") contains rich-media content that is not played while the second frame is not visible to the end user; c) the second frame is visible to the end-user and the first frame is not visible to the end-user after a URL request event is activated; d) the information packet data stream contains rich-media content that is played only when the second frame becomes visible to the end user; e) the second frame is visible to the end-user, and the first network data stream is unloaded from the first frame; f) the method further comprises the step of downloading a second network data stream ($2^{nd}$-NWDS) into the memory of the end-user computer after the user or a software routine has requested the $2^{nd}$-NWDS; g) the method further comprises the step of loading a data stream request code into a third frame of the multi-frame window after the user or a software routine has requested the $2^{nd}$-NWDS and the $2^{nd}$ NWDS has been downloaded to the end-user computer; h) the data stream request code references the second network data stream; i) only one frame is visible to the end-user at any given point of time; j) the second network data stream contains rich-media content that is not played as long as the second network data stream is not visible to the end-user; k) the second frame is visible to the end-user, the first network data stream is unloaded from the first frame; l) the method further comprises the steps of unloading the first data stream and the information packet data stream from the browser, and loading the second network data stream into a browser window in response to activation of the data stream request code; m) the second network data stream contains rich-media content that is played only when the second network data stream is loaded into the browser window or frame; n) the second network data stream is loaded into a frame in the multi-frame window; o) the second network data stream is loaded into a browser window; and/or (p) in the event that the second network data stream contains a BA activation code, the $2^{nd}$ NWDS becomes a first network data stream in a new, but independent, cycle of the embodiment.

One embodiment of the invention delivers a BA to a browser window even though the browser program might not recognize a target requested web page or even though the browser is processing an unknown URL event. For example, a publisher, provider, owner, designer or developer of the first network data stream has no prior knowledge of the source, location or domain of the second network data stream. Accordingly, an aspect of the invention provides a method as just described and further comprising the steps of: invoking an unload request code that causes the IPDS to unload from the browser window; unloading the information packet data stream from the browser window; and downloading a second network data stream into the browser session. The method can be further modified by including the steps of: performing the step of invoking the unload request code after unloading of the first network data stream; and/or performing the step of unloading the information packet data stream after a user has activated a command within the unload request code. The user can cause the unload request code to be invoked by entering a URL into the address bar of the browser window, clicking on a hyperlink that is not included in the first network data stream, or clicking on the browser "refresh" button.

The BA system of the invention can be used in conjunction with other network-based advertising systems. In one embodiment, a banner advertisement according to the invention and a secondary advertisement will be downloaded to a user computer from a server. During the interstitial time, the BA is displayed and then the secondary advertisement is optionally displayed. The secondary advertisement can be included in a frame of the first or second requested web page or as a separate "pop-up" or "pop-under" window. Accordingly, one embodiment of the invention includes a method of providing an information packet data stream to a user computer connected to a network, the computer having a processor, a memory connected to the processor and storing computer executable instructions, where the computer executable instructions include a browser program for the execution and display of data streams provided over a computer network, the method comprising the steps of:

requesting a first network data stream for display in a network browser session, wherein the first network data stream includes an activation code for initiating the downloading of an information packet data stream separate from or independent of the first network data stream;

creating a multi-frame window in a displayable browser session;

downloading a first network data stream from the network and loading it into a first frame of the multi-frame window;

downloading plural information packet data streams, wherein at least one of the information packet data streams is loaded into a second frame of the multi-frame window, and the remaining information packet data streams are stored in the memory of the computer;

downloading a second network data stream into the memory of the end user computer;

unloading the first information packet data stream from the second frame; and loading one or more of the information packet data streams from the memory of the end user computer into the same window as the second network data stream and/or into a separate window of the browser session.

Specific embodiments of the invention include those wherein: a) the second network data stream and other information packet data streams are loaded into a browser window different than that in which the first information packet data stream and the first network data streams are loaded into; b) the first information packet data stream contains code that invokes the loading of one or more of the remaining information packet data streams; c) the remaining information packet data streams are loaded with the second network data stream into the same browser session; d) the remaining information packet data streams are loaded with the second network data stream into the same frame; e) the method further comprises the step of loading from the computer a data stream request code into a third frame of the multi-frame window; and/or f) invoking a data stream request code that causes the unloading of the information packet data stream and the loading of the second network data stream from the memory of the end-user computer into the browser. The method can be further modified by performing the step of invoking after unloading of the first network data stream, and/or by performing the step of unloading the information packet data stream after a user has activated a command within the data stream request code. The user can cause the data stream request code to be invoked as described herein. Other specific embodiments described herein can be included in this aspect of the invention.

The BA system can be used in an electronic mail (email) environment. In this environment, a banner advertisement is displayed when an email message is "unloaded" from a viewing window in an electronic messaging program. Accordingly, one aspect of the invention includes a method of providing an information packet data stream through email to a user computer connected to a network, the computer having a processor, a memory connected to the processor and storing computer executable instructions, which include a method for the execution and display of data streams provided over a computer network utilizing email programs, and a browser program for the execution and display of data streams provided over a computer network, the method comprising the steps of:

a. downloading an email data stream to an email program of an end-user computer;
b. displaying the email data stream in a window or frame of the email or Internet browser software program, wherein the email data stream includes an activation code for the downloading of an information packet data stream independent of, or integrated with, the first email data stream;
c. if not already activated by the e-mail data-stream, activating a browser session in the end-user computer;
d. downloading an information packet data stream into the browser window; and
e. displaying the information packet data stream in the browser window.

Specific embodiments of the invention include those wherein: 1) the information packet data stream contains rich-media content that is not played while the information packet data stream is not visible to the end user; 2) the email data stream and the information packet data stream are displayed in the same browser window; 3) after step a), the method further comprises the alternate steps of: creating a multi-frame window in the browser session; loading the email data stream into a first frame of the multi-frame window; and loading the information packet data stream into a second frame of the multi-frame data window; 4) the first frame is visible to the end-user and the second frame is not visible to the end-user until such time as a URL event is activated; 5) first frame is not visible to the end-user and the second frame is visible to the end-user; 6) the email data stream consists of a data stream request code, which causes the further downloading of a first network data stream and the loading of the network data stream into the first frame of the multi-frame window; 7) the information packet data stream contains rich-media content that is not played while the second frame is not visible to the end user; 8) the email data stream and the information packet data stream are displayed in different windows, such as different Internet browser sessions or different frames within the same browser window; and/or 9) the email stream may be that of a newsletter. The email data stream optionally has an information packet data stream attached or otherwise directly associated to it, in which case, there need not be a separate step of downloading the information packet data stream separately from the email data stream. Other specific embodiments described herein can be included in this aspect of the invention.

The various specific methods of the invention can be combined to provide other unique and versatile systems. The method including two or more different information packet data streams can be combined with the method including email data streams. Accordingly, another aspect of the invention includes a method of providing plural information packet data streams and at least one email data stream to a user computer comprising the steps of:

a) downloading an email data stream to an email program of an end-user computer;
b) displaying the email data stream in a window of the email or browser program of the end-user computer, wherein the email data stream includes an activation code for the downloading of an information packet data stream independent of, or integrated with, the first email data stream;
c) if not already activated by the e-mail data stream, activating a browser session in the end-user computer;
d) downloading plural information packet data streams;
e) loading at least one of the plurality of information packet data streams into a browser window and storing the remaining plurality of information packet data streams in the memory of the end-user computer;
f) downloading a second network data stream, such as an e-mail or network data stream, into the memory of the end user computer;
g) unloading the email data stream from a window of the email or Internet browser program; and
h) loading at least one of the remaining information packet data streams and the second network data stream from the memory of the end user computer.

Specific embodiments of the invention include those wherein: 1) step g) above occurs as a result of activating an active link include within the first email data stream, or unloading of the email data stream from the window of the email program or Internet browser program; 2) at least one of the information packet data streams, the email data stream and/or the second network data stream are displayed in the same browser window; 3) at least one of the information packet data streams and the second network data stream are displayed in the same browser window; 4) at least the second network data stream and all the information packet data streams are all loaded into the same browser window; 5) a majority of the information packet data streams are loaded into different browser windows; 6) after step a), the method further comprises the alternate steps of: creating a multi-frame window in the displayable browser session; loading the email data stream into a first frame of the multi-frame window; loading at least one of the information packet data streams into a second frame of the multi-frame data window; and, after unloading of the e-mail data-stream and the information packet stream, loading the remaining information packet data streams and second network data stream from the memory of the end-user computer into the same or different browser windows; 7) step c) occurs after unloading of the email data stream and the first information packet data stream from the first and second frame of the multi frame window; 8) the email data stream, the second network data stream and all the information packet data streams are all loaded into the same window browser; and/or 9) step f) above occurs as a result of activating a hyperlink inserted within the first email data stream, or unloading of the email data stream from the window of the email or Internet browser program. The order of steps f) and g) above is interchangeable.

Another embodiment of the invention provides a BA program wherein delivery to and launch of a BA in a window of a program of the user computer is confirmed such that an advertiser, publisher or other third party, is able to determine whether or not an interstitial advertisement was rendered viewable after downloading to a user computer. This aspect of the invention is also applicable to other systems for delivering interstitial messages to user computers connected to a network. Accordingly, the invention provides a method of providing to an information packet data stream distributor with confirmation that an information packet data stream was loaded into the memory of or a program of an end-user computer connected to a network, the method comprising the steps of:

a) requesting a first network data stream for display in the network browser session, wherein the first data stream includes activation code for the downloading of an information packet data stream independent of the first network data stream and includes reporting code for the activation of a network reporting system in response to the loading of an information packet data stream into an end-user computer;
  b) creating a multi-frame window in a displayable browser session;
  c) loading the first network data stream into a first frame of the multi-frame window;
  d) downloading an information packet data stream into a second frame of the multi-frame window; and
  e) activating the reporting code and transmitting an information data stream to the network reporting system.

The delivery and launch confirmation system includes specific embodiments wherein the reporting code includes data identifying the first network and/or information packet data stream. Moreover, the invention also includes a method of providing to an information packet data stream distributor (which can be a person, server, computer or other such entity) with assurance that the information packet data stream is downloaded subject to pre-authorized criteria and with confirmation that the information packet data stream was loaded into an end-computer connected to a network, the method comprising the steps of:

a) requesting a first network data stream for display in the network browser session, wherein the first data stream includes activation code for the downloading of an information packet data stream independent of the first network data stream and includes reporting code for the activation of a network reporting system in response to the loading of an information packet data stream into an end-user computer;
  b) creating a multi-frame window in a displayable browser session;
  c) loading the first network data stream into a first frame of the multi-frame window;
  d) activating the reporting code and transmitting an information data stream to the network reporting system; and
  e) obtaining approval from the network reporting system for the downloading of an information packet data stream; after receipt of approval, downloading an information packet data stream into a second frame of the multi-frame window; and transmitting an information data stream to the network reporting system thereby confirming the loading of the information packet data stream into the browser window; or
  f) if approval is not received within a defined time period, not activating the activation code.

The delivery and launch confirmation system includes other specific embodiments wherein: 1) the information packet data stream is not downloaded without the approval required under step e); 2) the information packet data stream is not loaded into the frame of the multi-frame window without the approval required under step e); 3) a delivery confirmation data stream is transmitted to the network reporting system only when the $2^{nd}$ frame of the multi-frame window is made visible to the end-user, thus providing a confirmation that the information packet data stream was made available for viewing by the end-user, and not just down-loaded to the computer of the end-user; and/or 4) the reporting code includes data identifying the first network and/or the information packet data stream.

Another aspect of the invention provides network data stream server adapted to provide plural network data streams to a computer or server in a network, the server comprising plural network data streams adapted to being downloaded to another server or an end computer in response to a request received from the other server or end computer, wherein at least one of the network data streams comprises an activation code for initiating the download of an information packet data stream. Specific embodiments include those wherein: 1) the at least one network data streams further comprises reporting code for sending a delivery confirmation data stream to a network reporting system in response to the loading of an information packet data stream into the other server or end computer; 2) the reporting code further comprises code for sending a display confirmation data stream to the network reporting system; 3) the at least one network data streams further comprises reporting code for sending an approval request data stream to a network reporting system and for sending a delivery confirmation data stream to a network reporting system in response to the loading of an information packet data stream into the other server or end computer; and/or 4) the reporting code further comprises code for sending a display confirmation data stream to the network reporting system in response to the display of the information packet data stream at the end computer.

The invention also provides a network reporting system comprising:

a network reporting system server comprising a database comprising information on the number of times an information packet data stream has been downloaded to or made viewable at an end computer, optionally the date and time on which the information packet data stream was downloaded to or made viewable at an end computer, and optionally the IP addresses of the computers to which the information packet data stream was downloaded or at which the information packet data stream was made viewable;
  an end computer or server comprising a network reporting code comprising code adapted to send a delivery confirmation data stream to the network reporting system server to confirm delivery of the information packet data stream to the end computer or server.

Specific embodiments include those wherein: 1) the network reporting code further comprises code adapted to send an approval request data stream to the network reporting system server requesting permission to download to the end computer the information packet data stream from an information packet data stream server; 2) the network reporting code further comprises code adapted to send a display confirmation data stream to the network reporting system server confirming that the information packet data stream was rendered viewable at the end computer or server; and/or 3) the network reporting code further comprises code adapted to send a display confirmation data stream to the network reporting system server confirming that the information packet data stream was rendered viewable at the end computer or server.

The invention further provides a network end computer comprising a network browser program, a memory, and a first network data stream displayable in a single or multi-frame window of the browser program, wherein the first network data stream comprises activation code for initiating the downloading of a first information packet data stream to the end computer from a network information packet data stream server when the activation code is invoked. Specific embodiments include those: 1) further comprising a first information packet data stream downloaded from an information packet data stream server in response to activation of the activation code; 2) further comprising a data stream request code loaded into a window of the browser program; 3) wherein the first network data stream is loaded into a first frame of the browser window, the first information packet data stream is loaded into a second frame of the browser window, and the data stream request code is loaded into a third frame of the browser window.; 4) wherein the data stream request code references a second network data stream or a second information packet data stream; 5) further comprising an unload request code that is activated upon activation of a URL event in the browser window in which the network data stream is being displayed; 6) wherein the unload request code causes the first information packet data stream and/or the first network data stream to unload from the browser window, and causes a second network data stream or second information packet data stream to load into the browser session; 7) further comprising a network reporting code comprising code adapted to send a delivery confirmation data stream to a network reporting system server to confirm delivery of an information packet data stream to the end computer; 8) wherein the network reporting code further comprises code adapted to send an approval request data stream, to a network reporting system server, requesting permission to download to the end computer an information packet data stream from an information packet data stream server; and/or 9) wherein the network reporting code further comprises code adapted to send a display confirmation data stream to a network reporting system server confirming that an information packet data stream was made viewable at the end computer.

Still other aspects of the invention provide an end computer comprising a network browser program, a memory, an email program adapted to display an email data stream in a browser window operating within or outside the email program, and an email data stream comprising an activation code for initiating the download of an information packet data stream. Specific embodiments include those: 1) further comprising a first information packet data stream downloaded from an information packet data stream server in response to activation of the activation code; 2) further comprising a data stream request code loaded into a browser window operating within or outside the email program; 3) wherein the first network data stream is loaded into a first frame of the browser window, the first information packet data stream is loaded into a second frame of the browser window, and the data stream request code is loaded into a third frame of the browser window; 4) wherein the data stream request code references a network data stream, a second email data stream or a second information packet data stream; 5) further comprising an unload request code that is activated upon activation of a URL event in a browser window, wherein the unload request code causes the first information packet data stream and/or the email data stream to unload from the browser window, and causes a network data stream, second information packet data stream or second email data stream to load into the browser session; 6) further comprising a network reporting code comprising code adapted to send a delivery confirmation data stream to a network reporting system server to confirm delivery of an information packet data stream to the end computer; 7) wherein the network reporting code further comprises code adapted to send an approval request data stream, to a network reporting system server, requesting permission to download to the end computer an information packet data stream from an information packet data stream server; and/or 8) wherein the network reporting code further comprises code adapted to send a display confirmation data stream to a network reporting system server confirming that an information packet data stream was made viewable at the end computer.

The invention also provides a network advertising system comprising:
  a) an end computer comprising a processor, a memory connected to the processor and storing computer executable instructions, wherein the computer executable instructions include a browser program for the execution and display of data streams provided over a network;
  b) an information packet data stream server comprising plural information packet data streams; and
  c) a network data stream server adapted to provide plural network data streams to the end computer, the server comprising plural network data streams adapted to being downloaded to the end computer in response to a request received from another server or the end computer;
  d) wherein at least one of the network data streams comprises an activation code for initiating the download of an information packet data stream to the end computer from the information packet data stream server when the activation code is invoked.

Specific embodiments include those: 1) further comprising a network reporting system; 2) wherein the end computer further comprises a data stream request code loaded into a window of the browser program, and the data stream request code references a second network data stream, a second information packet data stream or an email data stream; 3) wherein the end computer further comprises an unload request code that is activated upon activation of a URL event in the browser window in which the network data stream is being displayed, and wherein the unload request code causes the first information packet data stream and/or the first network data stream to unload from the browser window, and causes a second network data stream or second information packet data stream to load into the browser session; and/or 4) wherein the end computer further comprises an email program adapted to display an email data stream in a browser window operating within or outside the email program, and an email data stream comprising an activation code for the initiating the download of an information packet data stream.

Many of the specific embodiments of the different aspects of the invention can be combined to form a network advertising banner system and/or method according to the invention.

BRIEF DESCRIPTION OF THE DRAWINGS

The following drawings are part of the present specification and are included to further demonstrate certain aspects of the invention. The invention may be better understood by reference to one or more of these drawings in combination with the detailed description of the specific embodiments presented herein.

DETAILED DESCRIPTION OF THE INVENTION

Figure 1:
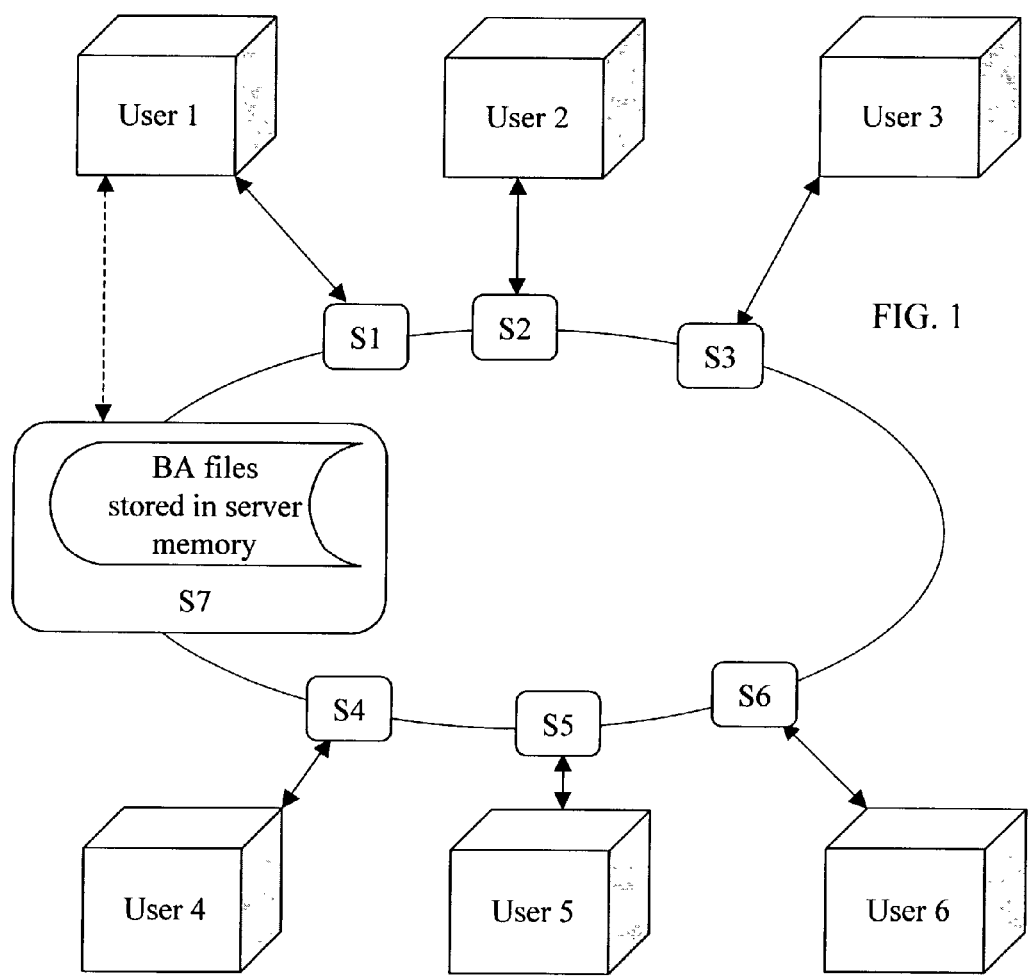
FIG. 1 depicts an exemplary network of user computers and Internet servers that can be used to practice the method of the invention.

The BA of the invention requires at least one user computer and at least one network server. The user computer stores one or more BA files of the invention at a time, whereas the network server stores many different BA files of the invention and is used as an archive or database of BA files. The banner advertisement of the invention can be an audible advertisement, a viewable advertisement or an audible and viewable advertisement. While the term advertisement is generally associated with a communication advertising a product or service, the term advertisement, as used herein, is taken to mean any form of electronic information packet data stream that can be transmitted over a network. The terms banner advertisement and banner ad are used interchangeably herein and refer to any standard form or method of network electronic advertisement, such as skyscraper ads, pop-up ads, pop-under ads and conventional ads adapted for display in browser windows. Such advertisements can be of any shape or size when displayed. For example, a notice, message, flyer or other such communication is included in the definition of advertisement. An "information packet data stream" is defined as a combination of data packets streamed to an end-user via a communication network, such as the Internet, that present upon the end-user computing machine an advertisement as described herein, when combined together by applying standard communication protocols, such as TCP/IP protocol, and software programs, such as Internet browser software applications. The BA system and method is useful in any electronic network based advertising environment wherein advertisements or other information data stream packets are sent to users' computing machines, such as computers, PDA's and telephones.

As used herein, an activation code is a software routine, function or group of functions that initiates (starts) another program, routine, function or group of functions.

As used herein, a URL event is any event, prompted by the user or a software routine, that causes a second web page to be requested. Exemplary events include entering a URL address in the address bar of the browser program, clicking on an activated link in a web page, or clicking on a 'Favorites' web page, activating browser based code such as the "Back" or "Refresh" buttons.

As used herein in reference to a data stream, the term "unload" refers to the process of removing the data stream from a window or frame of a multi-frame window. Alternatively, the term unload refers to the process of making a data stream not visible to a user such as by placing the data stream in a different window.

A BA file according to the invention can comprise one file or a cluster of files or other forms of data streams used in computer network communications. For example, a web page generally comprises a cluster of graphics and text files as well as embedded scripts. As used herein, the term "BA file" refers to a single file or a cluster of files, or other forms of data streams used in computer network communications, that together comprise the content of the BA when viewed in the window of a browser. The cluster of files that comprise the BA file can be referred to as an html (hypertext mark-up language) file, which file may comprise a cluster of other file types that are downloaded sequentially or concurrently onto a user's computer. Exemplary file types include html, text file, graphics file, executable script, java script file, ACTIVE-X™ file, FLASH™ file, MULITMEDIA™ file, video file, music file, audio file, CGI script, macro-media director file, REAL PLAYER™ file, QUICKTIME™ file, mpeg file, tiff file, gif file, pdf file, MIDI file, plug-in file and others known to those of ordinary skill in the art.

A BA file is downloaded onto a user computer before, during or after the user has requested and received a (first) web page. The BA file is not displayable, i.e., is not served up to a viewable user browser window or frame until after the user has requested a second web page. Alternatively, it is placed in a non-viewable user browser until after the user has requested a second web page. Shortly or immediately after the request for the second, or another, web page has occurred, the BA file is served up to (loaded into) and is displayable in a browser window. If the BA occurs in the same browser window as that of the previously viewed or just requested web page, the BA assumes a dominant position in the browser window until download of the just requested web page is complete. At that point, the BA optionally assumes an inferior position and the requested web page is served up to and viewed in the browser window. If the BA occurs in a window that is different than the window in which the previously viewed web page occurred or in which the just requested web page will occur, the window with the BA assumes a dominant position over the requested page window until download of the requested page is complete. At that point, the window with the BA optionally assumes an inferior position with respect to the window with the just requested web page.

The window of a browser session can include a single frame or multiple frames. In the multi-frame window, the layout of the frames can be any layout that is acceptable to the browser program. The window containing the BA can be the same the window containing the source web page and/or the requested web page (network data stream). In this embodiment, the single window containing the two different data streams is typically a multi-frame window. Alternatively, the window containing the BA can be separate from the window containing the source web page and/or the requested web page. In this case, each window is independently selected at each occurrence from a single frame window and a multi-frame window.

By the term "displayable" is meant that the advertisement created with the BA data stream (file) will be visible and/or audible to an operator of a user computer. When the BA data stream creates an audible advertisement, the BA data stream is "displayed" by rendering it audible to a user through a speaker or other sound-generating component associated with the user computer. When the BA data stream creates a viewable advertisement, the BA data stream is "displayed" by rendering it viewable to a user through a monitor or other visual signal-generating component associated with the user computer. When the BA data stream creates an audible and viewable advertisement, the BA data stream is "displayed" by rendering it audible and viewable to a user as described herein by way of one or more components associated with the user computer. Accordingly, a display component of a user computer is either a monitor, speaker, headphone, projector or other such conventional components typically operably engaged with a user computer.

FIG. 1 depicts an exemplary network comprising plural user computers (User 1-User 6) and network servers (S1-S7). The server (S7) includes a memory (information storage medium) comprising stored BA files. The network can be an external network, such as the Internet, or an internal network, such as an Intranet or local area network. The users access the network through normal channels such as a T1 line, telephone modem, computer modem, cable modem, DSL modem, fiber optic cable, wireless modem, and such other access means that are commonly known in the industry of computer networks' access technologies. In other words, the components of a network can be connected in a hardwired and/or wireless manner. For example, User 1 accesses the Internet by using a computer modem connected to a telephone to connect to the Internet server S1, which belongs to an Internet Service Provider (ISP). User 2 accesses the Internet by connecting to the server (S2) via a cable (TV) modem. User 3 accesses the Internet by connecting to the server (S3) with a T1 line, and so on. Alternately, a user can access the server (S7) containing the BA files directly, as shown by the dashed arrow, using any of the above-mentioned methods. Where the system is an Intranet, the server (S7) can be the central or a peripheral server. The invention also includes embodiments wherein one or more of the required servers is a built-in server included within a respective end computer.

Figure 2:
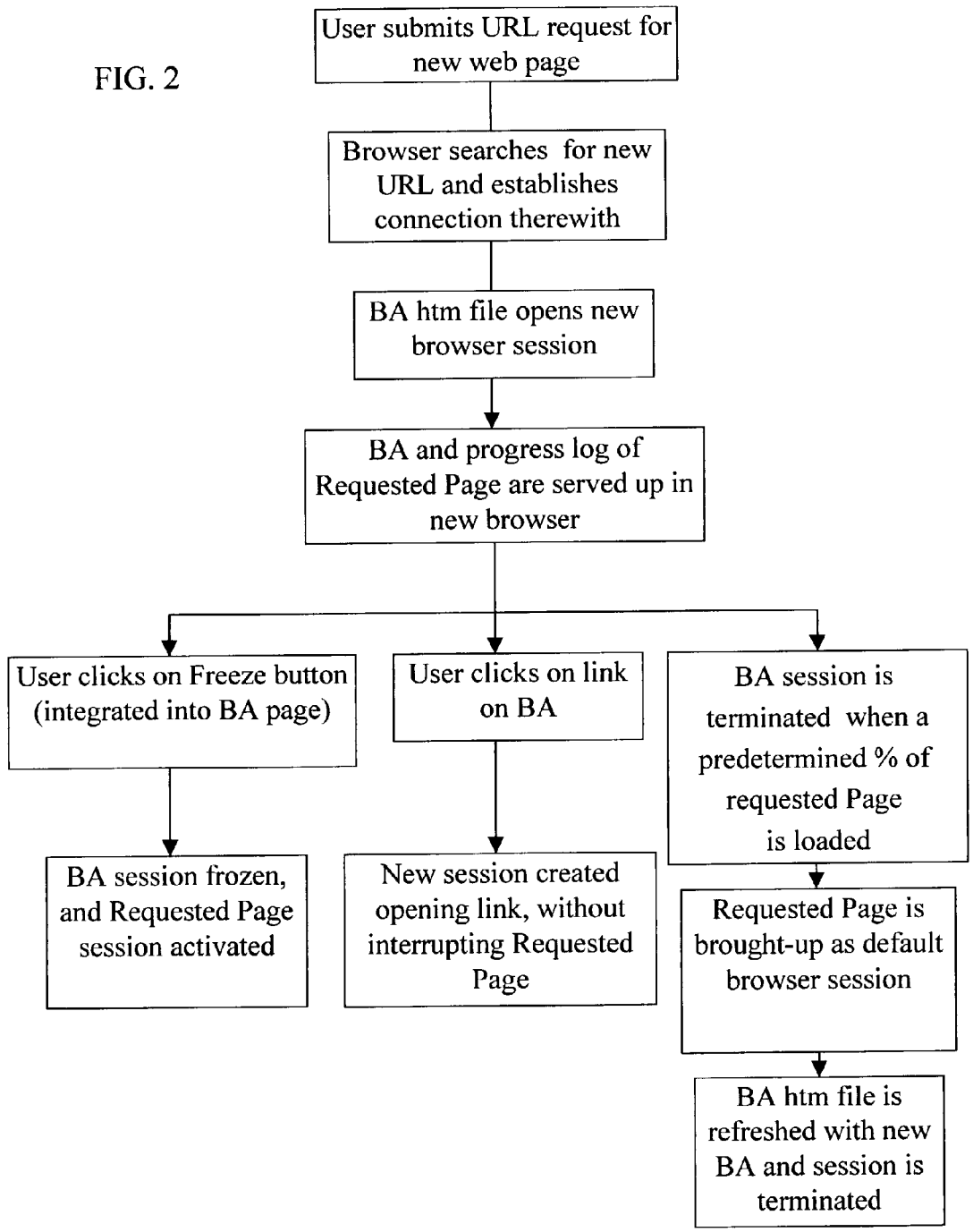
FIG. 2 depicts a general flowchart of the steps that occur during the method of the invention.

FIG. 2 depicts a general schematic of the steps involved in the system and method of the invention as they can occur during a browser session on the Internet or other computing network system, for example. After a user has connected to the computer network and has a browser window open, he submits a request for a specific web page using any of the conventional procedures, such as by clicking on a link, or entering the URL (Uniform Resource Locator) address of the web on the address bar of the browser window. After receiving the request, the browser program searches the network for the requested web page and establishes a connection with it. As the requested web page is being downloaded onto the user computer from a server, the BA program of the invention opens a banner ad file previously downloaded onto the user computer. The banner ad file is served up to a window of the browser. The program of the invention provides a status bar that can depict the status (such as percent downloaded or number of files downloaded or number of files yet to be downloaded or that the files are in the process of being downloaded) of the downloading of the requested page. While the banner ad window is open, the web user has several options available to him. He may freeze (pause) the banner ad window, request another web page via the banner ad window or close the banner ad window. Other options may also be available. These options are elected by entering keyboard commands, using the graphic user interface, utilizing voice commands, retinal scanning systems, clicking on one or more active links placed within the banner ad window in a manner similar to the placement and activation of hyperlinks in standard network web pages or utilizing such other methods commonly used for communicating between the user and the computer. When the banner ad window is frozen, the user can proceed to the requested web page window, while keeping the banner ad window open. The user can request another web page via the banner ad window by clicking with a mouse on an active link in the banner ad window. By doing so, the browser program begins to search the network for the just requested page. The newly requested page can be downloaded into the same window as the banner ad or into another window. Once a predetermined percentage or amount of the first requested page has been downloaded onto the user computer, or after a predetermined time period has lapsed, the banner ad window closes and the window with the first requested page is served up. While the first requested page is being viewed by the user or being downloaded onto the user's computer, the original banner ad file is replaced on the user's computer with another one. In other words, the BA file replacement generally occurs in the background preferably without disrupting the user's viewing of the first requested page.

Figure 3A:
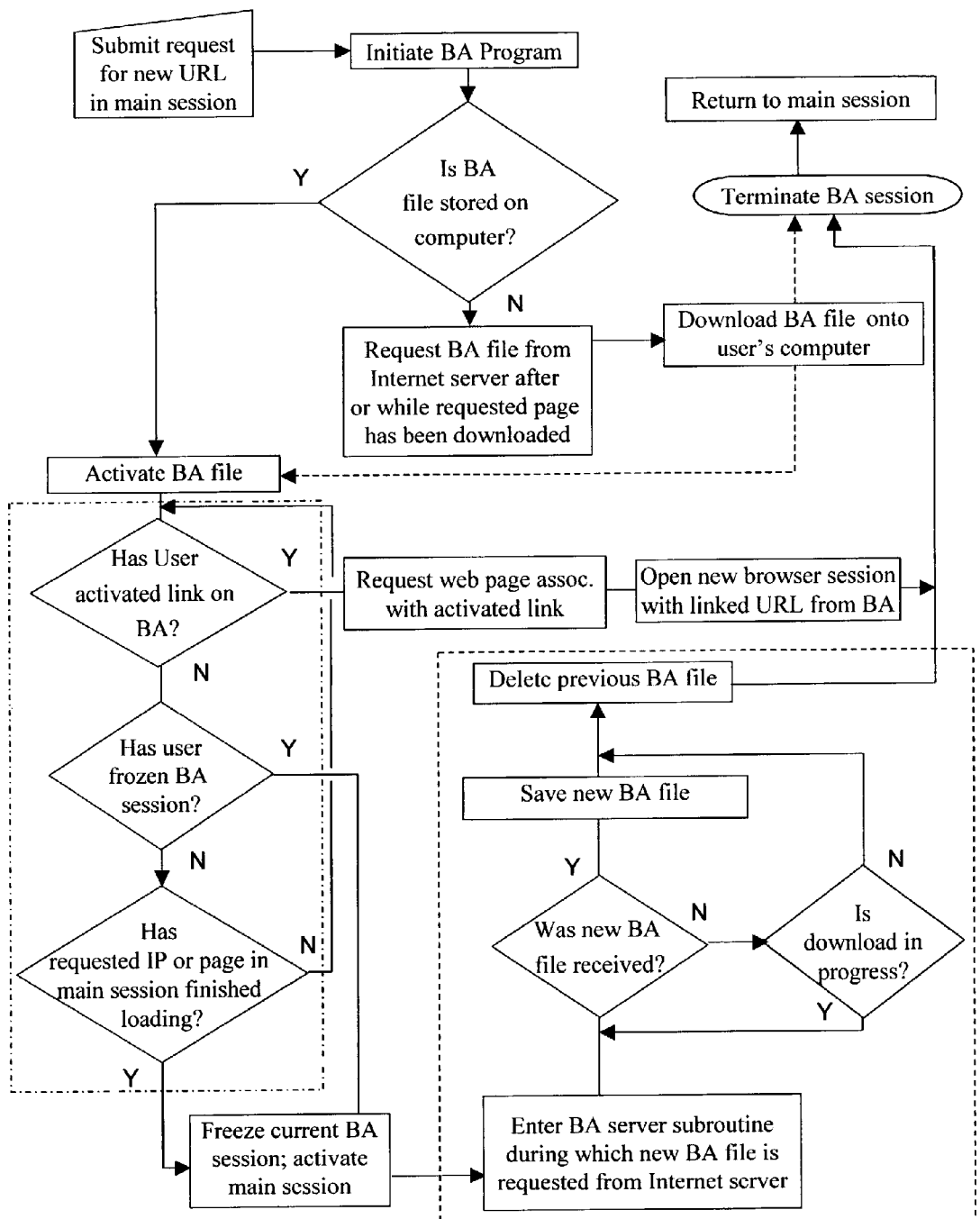
FIGS. 3a-3b depict exemplary logic flowcharts that describe the system and method of the invention as it occurs on the computer of a user.

FIG. 3a depicts a more detailed logic flow chart for a program that is used with the system and method of the invention. As with FIG. 2, this logic flow chart begins once the web user has requested a new web page. The BA program is initiated after the user's request. The BA program then determines whether or not a BA file is already stored on the memory of the user's computer. If it is, the BA file is activated, and the BA is displayed on the user's monitor, either in the same window as his current web page or in a window that is separate from the one of his current web page. If the BA file is not already stored on the user's computer, the BA program waits for completion of the download of the requested web page and, or concurrent with download of the requested web page, then requests a BA file from the server having BA files stored therein. The BA file is downloaded onto the user's computer while the user is viewing the requested web page; therefore, download of the BA file does not interfere significantly with the user's viewing of the requested web page. The downloaded BA file can be stored in the memory of the user's computer for up-loading to the browser at a later time. Alternatively, once downloading of the BA file is complete, the BA program either terminates, or the BA file is uploaded to a browser window shortly after its downloading is complete.

If the BA program detects a previously loaded BA file on the user's computer, the file is activated and the BA is served up to the window of the browser. While the BA is viewable in the window, the BA program determines whether or not: 1) downloading of the requested web page has completed; 2) time out has occurred; 3) the user has frozen the window containing the BA; or 4) the user has activated a link on the BA. The four determinations can be made in any order and need not be made in the order set forth above or depicted in the box defined by the dot-dash line of FIG. 3a. If downloading of the requested web page is complete, if a time out has occurred or if the user has frozen the BA, the BA program pauses the BA session and returns the browser program to the main session that includes the just requested web page. If the user has activated a link in the BA, the BA program requests the web page associated with that link and opens a new browser window for that web page, and the main browser session returns to the just requested web page. Upon opening of the new browser window, the BA session terminates.

If the BA window has been paused (frozen), the BA program enters into a background mode of operation as depicted in the box defined by the dashed line of FIG. 3a. These steps occur while a user is viewing the requested web page in the main (first) browser session (window). The BA enters a BA server subroutine (or macro), during which the user's computer communicates with the server as described in FIGS. 4-6 and the user's computer requests a new BA file from the server containing BA files. The BA program then determines whether or not the new BA file has been completely downloaded. If not, it determines whether or not the download is in progress. If it is no longer in progress, the session has presumably frozen and the previous BA file is deleted. The program repeatedly requests the status of the download of the new BA file until it is complete. Upon completion of the download of the new BA file, the BA program deletes the previous BA file and the BA session is terminated.

One or more active links can be included in a BA according to the invention. Suitable active links include all types of links known in the field of Internet programming and web pages. An active link can include an ACTIVE-X™ control, FLASH™ control, flash animation, image, macro-media director file, real, QuickTime™, MPEG, MIDI, executable files and such other files that are commonly known in the industry of software programming. An active link is activated, by a viewer of the BA, by employing either a mouse (graphic user interface device), voice recognition equipment and software and/or the keyboard. Activation of an active link will cause the opening of a different browser window, which will open with the web page requested by such active link. The main browser program will then return to the main browser window that includes the just requested web page.

The BA program may include an optional feature to pause (save or freeze) the BA. Pausing the BA program will prevent the BA session from terminating, but will not interfere with the loading process of the requested page session. The 'freeze' button will be integrated into the BA page. Upon activating the 'freeze' button, the user will be able to return to the main session while keeping the BA in the background (relative to the main browser session), activate a link on the BA page, or terminate the BA session.

Figure 3B:
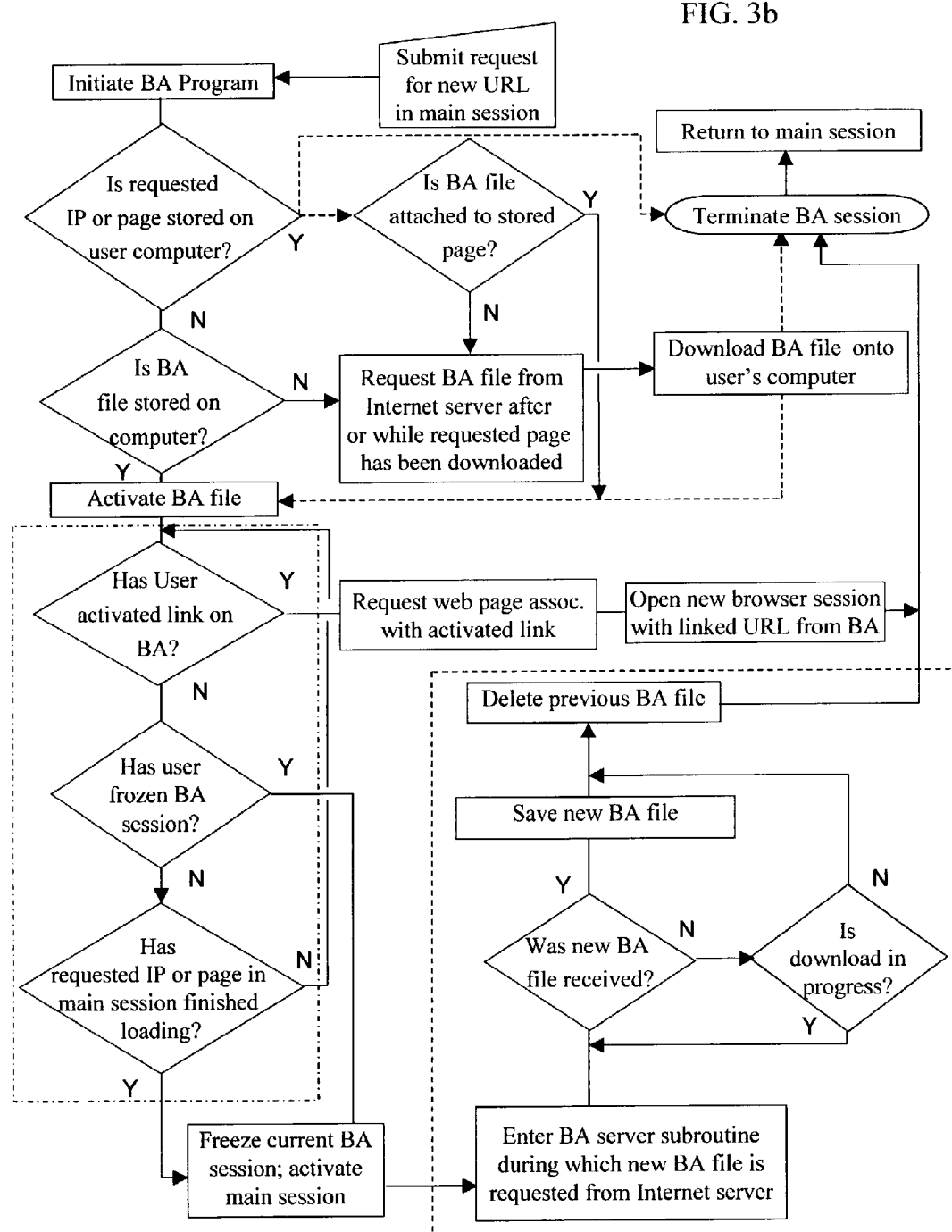

An alternative embodiment of the logic flow chart is depicted in FIG. 3b, which differs from FIG. 3a in the part of the chart that precedes the step of activating the BA file. As with FIG. 3a, the logic flow chart of FIG. 3b begins once the web user has requested a new web page. The BA program is initiated after the user's request. The BA program then determines whether or not a file corresponding to the requested web page is already stored in the memory of the user's computer. If it is, the BA program can be terminated, as indicated by the dashed arrow. Alternatively, if the web page file is stored on the user's computer, the BA program then determines whether or not there is a BA file attached to the web page file. If it is, then the attached BA file is activated. If it is not, then the BA program waits for completion of the download of the requested web page and, or concurrent with download of the requested web page, then requests a BA file from the server having BA files stored therein. If a file corresponding to the requested web page is not already stored in the memory of the user's computer, the computer determines whether or not a BA file is stored in the memory of the user's computer. If it is, the BA file is activated, and the BA is displayed on the user's monitor, either in the same window as his current web page or in a window that is separate from the one of his current web page. If the BA file is not already stored on the user's computer, the BA program waits for completion of the download of the requested web page and, or concurrent with download of the requested web page, then requests a BA file from the server having BA files stored therein. The BA file is downloaded onto the user's computer while the user is viewing the requested web page; therefore, download of the BA file does not interfere significantly with the user's viewing of the requested web page. The downloaded BA file can be stored in the memory of the user's computer for uploading to the browser at a later time. Alternatively, once downloading of the BA file is complete, the BA program either terminates, or the BA file is uploaded to a browser window shortly after downloading is complete.

Figure 4:
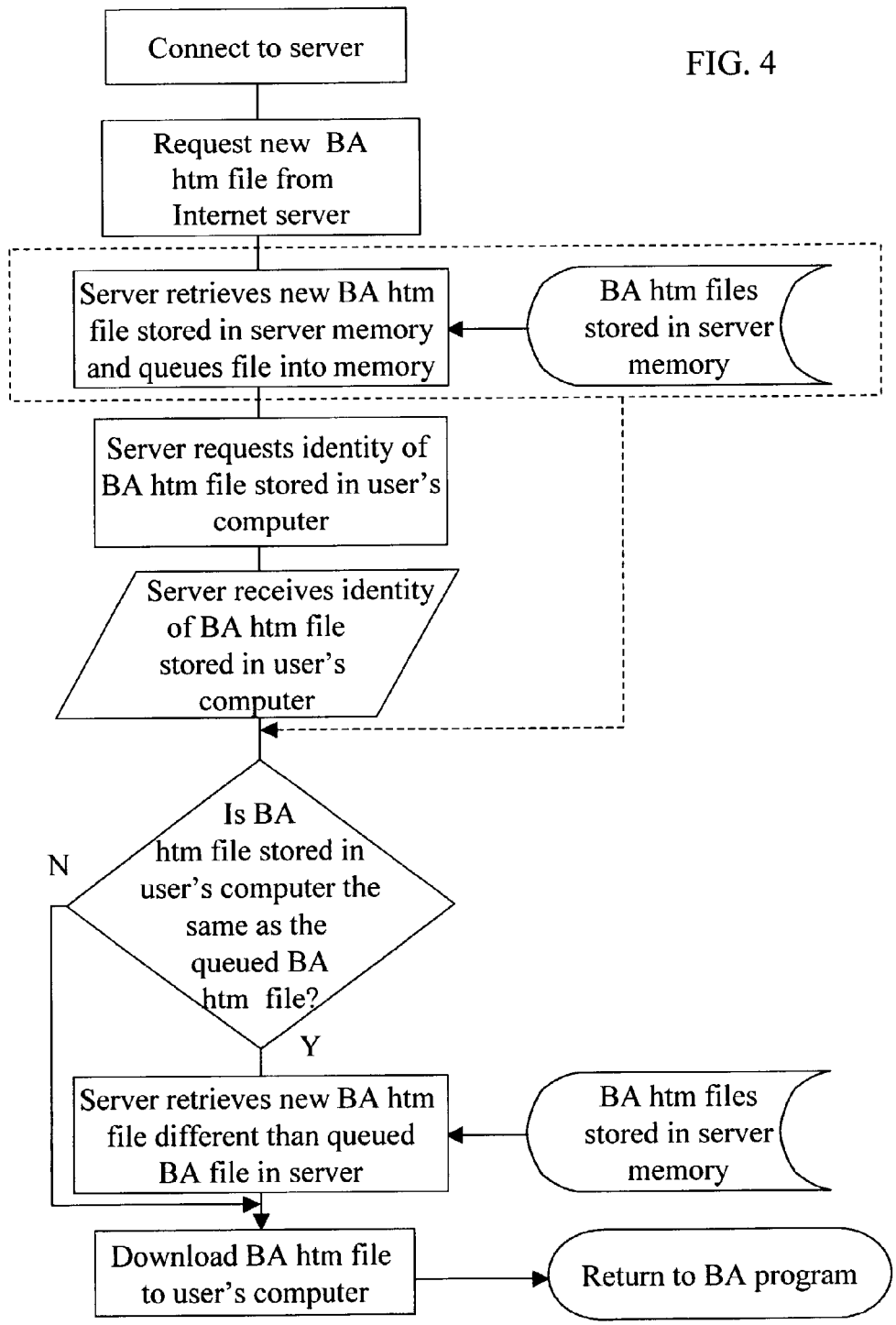
FIGS. 4-7 depict exemplary logic flowcharts that describe a subroutine of the system and method of the invention as it occurs on a server in communication with the user's computer.
Figure 5:
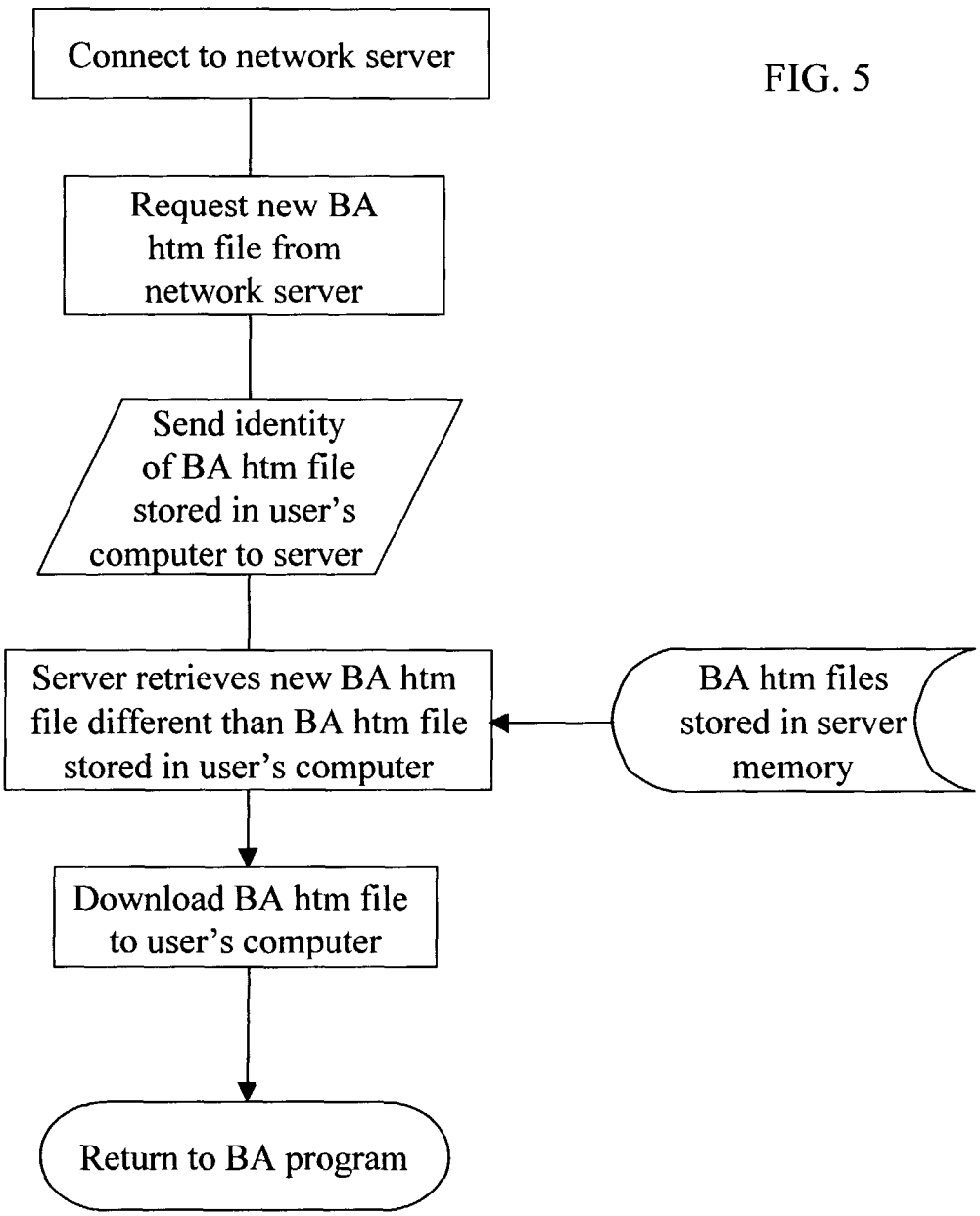
Figure 6:
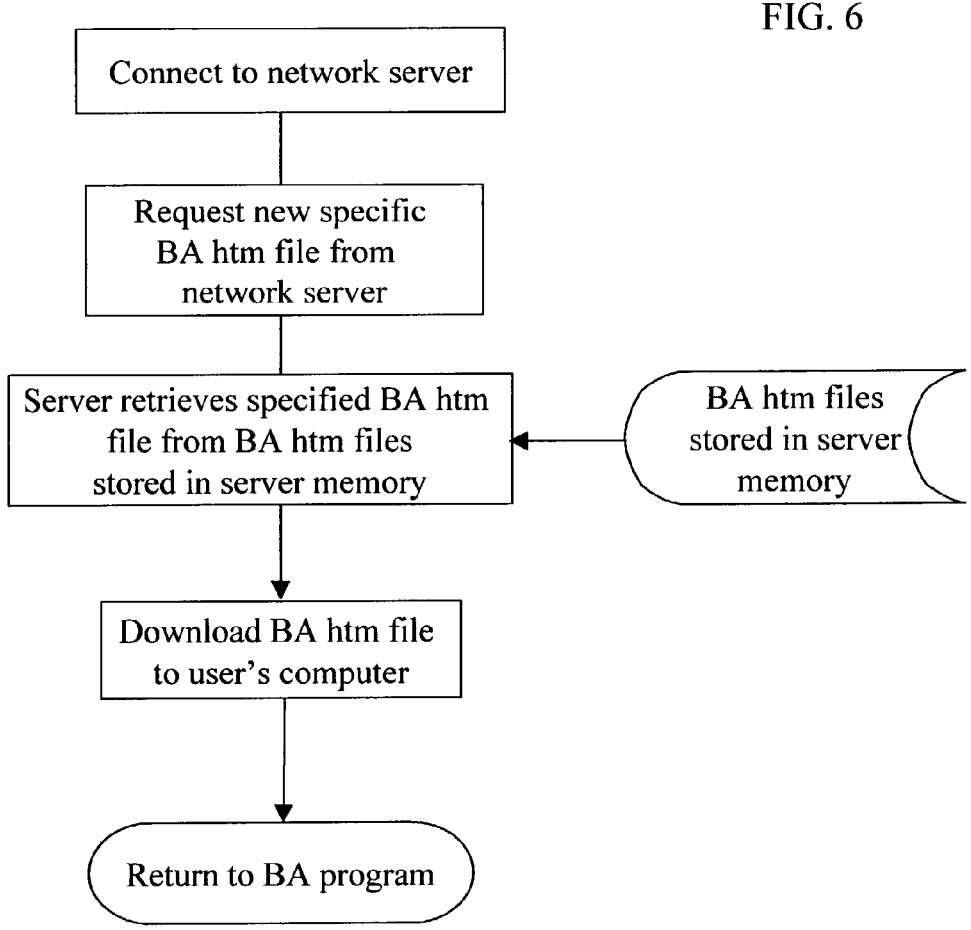

The BA server subroutine that is part of the BA program is available in a number of different embodiments, some of which are depicted in FIGS. 4-6. Each of the BA server subroutines begins when the session (window) for the BA has frozen, as depicted in FIGS. 3a-3b. Although referred to herein as a subroutine, the BA server subroutine can also be a macro CGI script for the BA program and such other subroutines commonly known in the industry of Internet software programming. In the subroutine depicted in FIG. 4, the BA program requests a new BA file from the server containing plural stored BA files. The server retrieves a BA file from its memory and queues the file. The server then requests the identity of the BA file stored in the user's computer. Once the user's computer responds with the identity of its BA file, the server determines whether or not the new BA file is the same as the BA file already stored in the memory of the user's computer. If the two BA files are the same, the server retrieves a different new BA file and downloads it onto the user's computer. If the BA file on the user's computer and the queued new BA file are different, the server downloads the queued new BA file onto the user's computer. Upon completion of the BA server subroutine, the BA program returns to its main logic flow chart as depicted in FIGS. 3a-3b. In the embodiment of FIG. 4, the user's computer initially requests an unidentified BA file, i.e., the identity of the requested BA file is not specified. In other words, the user's computer merely sends a generic request for a BA file.

In the subroutine depicted in FIG. 5, the BA program requests a new BA file from the server containing plural stored BA files. The user's computer then sends the identity of its stored BA file to the server. The server then retrieves a new and different BA file from its memory and downloads it to the user's computer. Upon completion of the BA server subroutine, the BA program returns to its main logic flow chart as depicted in FIG. 3. As with the embodiment of FIG. 4, the user's computer in this embodiment initially requests an unidentified BA file, i.e., the identity of the requested BA file is not specified.

Since the embodiments of FIGS. 4-5 do not request a specific BA file, the content of the new BA file may or may not be related to the requested web page or the web page that the user was just viewing or the BA of a competitor of the host of the web page might unfortunately appear. It is possible, however, for the user's computer to request a specific BA file such that the host of a website or web page can specify a particular BA thereby enhancing the marketing of a good or service. In the subroutine depicted in FIG. 6, the BA program requests a specific (predetermined identity) new BA file from the server containing plural stored BA files. The server then retrieves the specified BA file from its memory and downloads it to the user's computer. Upon completion of the BA server subroutine, the BA program returns to its main logic flow chart as depicted in FIGS. 3a-3b.

Figure 7:
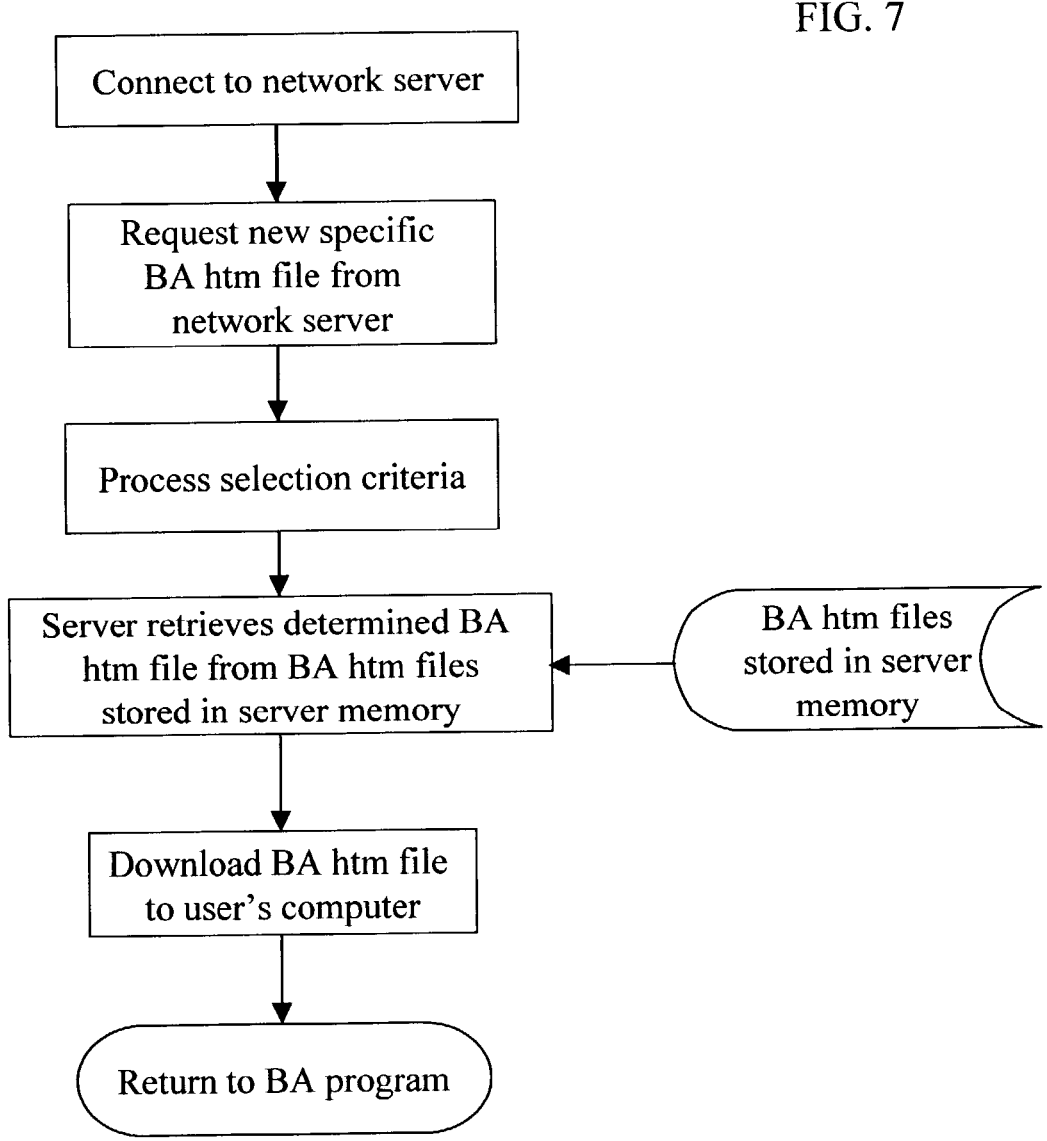

FIG. 7 depicts another embodiment of the routines described above, wherein the user computer does not request a specific, predefined BA file. The content of the new BA file may or may not be related to the requested web page or the web page that the user was just viewing. In the subroutine depicted, the user computer connects to the network server and the BA program requests a new BA htm file from a server containing plural stored BA files. One or more selection criteria, such as criteria that are based upon the time of day the request is made, the geographic locale from where the request is made (where the end-user computer is physically located) or the domain from where the request originated from, may then be processed by the server and used to determine which new BA file to send. The server then retrieves the determined BA file from its memory and downloads it to the user's computer. Upon completion of the BA server subroutine, the BA program returns to its main logic flow chart as detailed above.

Given the potentially diverse content of the BA files, they can be categorized into and/or indexed according to classes, subclasses, genera, groups and/or subgroups. Alternatively, they can be identified according to unique identifiers, such as unique URL's addresses. A BA file can, therefore, be requested according to a class, subclass, genus, group, and/or subgroup to which the BA file belongs. Likewise, the BA file can be requested according to its unique identifier. In other words, the BA program can request a specific BA file, or it can request an unspecified BA file, which is a member of a specific group, subgroup, class, subclass, and/or genus of BA files. This type of identifier data can also be incorporated into or used by a network reporting system according to the invention.

The identity of the specified BA file can be determined according to a number of methods. For example, a web page that a user is currently viewing might include embedded command language specifying the identity of the BA file to be requested. Accordingly, while the web page is being viewed, the BA program obtains the identity of the specified BA file from the web page and sends its identity to the network server by way of the BA server subroutine described above. The command language embedded in the web page may be java script, applet or such other command languages commonly known in the industry of Internet web page programming.

Alternatively, the identity of the specified BA file can be determined by information stored on the user's computer in the form of a cookie, which information can be called upon to determine the identity of the specified BA file. The identity of the specified BA file can also be determined by the origination and address of the requested web page or by information stored on a server or other centralized computing system in the form of data that can be called upon to determine the identity of the specified BA file. The network reporting system can be adapted to use information obtained from the user computer.

The content of a specified BA file may be related to the content of the web page that a user was viewing or has requested; however, it need not be so.

The BA window can include a header identifying it as an "advertisement", so as to reduce consumer confusion between the ad, and the requested web page.

Click-on capabilities (e.g. hyperlinks) may be added to the BA. When a hyperlink is activated, a new browser session will be opened (so as not to disrupt the main surfing session), and the user will be linked as per the click-on request.

The BA program may enable the storing of multiple BA files on the user's computer, in which case the BA program will request specific BA files. BA files will be replaced by subsequent specific BA files, or the BA program may cause their deletion after predetermined time periods.

If a user computer or a network server fails to execute any of the command language included in the browser program, BA program, BA server subroutine or other such software, the respective program can be terminated by a user. Alternatively, the program is terminated by the computer by including in such programs conventional termination sequences and command language. For example, the BA program can include a termination sequence to occur after a predetermined time period, or the failure to load of the requested web page.

The advertising system and method of the invention is generally intended for use in distributing any information packet data stream to an individual or group of individuals. One conventional use is the marketing of goods or services. In one embodiment, the BA program is provided to licensees or subscribers of an advertisement service provider (AdSP), which network servers include the BA files. The BA program is stored on a network server and run temporarily on a connected user computer. Alternatively, the source code for the BA program is included in a web page. The BA program may be in the form of programming language, such as java script or applets, which are incorporated into the web page, or such other script or software language commonly known in the network communications programming industry. Such script includes programming language that submits requests to the BA server to submit BA files that are attached to the web page. Such script includes additional programming language that enable the BA features otherwise described, including instructions to not be viewable while the first web page is being viewed by the user, to launch the BA file upon submitting the request for the requested second web page and the ability to freeze the BA file. By integrating the BA activation code into the web page, licensees will have ultimate control as to when and how the BA is launched. The BA program would be activated when surfing web pages published by licensees who sign onto the advertising service, and accept the AdSP's licensing terms. Alternatively, the BA program is activated when surfing (going) from a licensee web site to a non-licensee web site because it will have been activated by the code incorporated into the licensee's page.

In general, the system and method of the invention may be used to conduct e-commerce under any of a number of scenarios. Under one scenario, an advertisement service provider (AdSP) has one or more servers containing banner ad files. An e-commerce company (EC) having a business website subscribes to the ad-serving business of the AdSP. The website of the EC includes one or more web pages and one or more of those web pages includes a BA program and respective activation code embedded in the page. The BA program on a web page includes a request for a specific BA file from the server of the AdSP. A first-time customer of the EC connects to the web page having the embedded BA program. While a viewer is viewing the EC's web page, the BA program obtains a BA file from the server of the AdSP and downloads it onto the user's computer. When the user requests another web page the BA program is activated and the BA file is served up to a browser window, while the user is waiting for the content of the requested web page to download. After download of the requested page is complete, the BA is superceded by the requested web page, and the BA program continues along its intended logic path.

Income may be generated by charging a licensee (subscriber) a royalty each time a BA file is downloaded onto a user computer. For example, the licensee is charged a fee (F) of $X or Y cents each time the BA file Z is downloaded onto a user computer. So the royalty (R) would be determined as follows: $R = n \times F$, wherein n is the total number of times that the BA file Z was downloaded from the server onto a user computer during a given time period. The value n is determined by using a counter (software and/or hardware) associated with the network server to keep track of the number of times a specific BA file is downloaded onto a user computer, which may or may not necessarily be the same user computer. Alternatively, a counter (software and/or hardware) could be associated with the user's computer to keep track of the number of times and the identity of BA files downloaded and viewed by the user. The present BA system and method as well as the present network reporting system can be adapted to employ any known compensation scheme already used in the network electronic advertising industry.

Computers now have embedded within them an electronic processor serial number. If a user computer has the processor serial number activated, the server of the AdSP can be modified to include a program that tracks the number of times a specific user computer downloads specific BA files. By doing so, the AdSP is able to obtain valuable marketing data regarding the on-line habits of specific users. Moreover, the AdSP will be able to determine which users click on which types of BA's and what topics are of interest to specific users. This information can also be used by the network reporting system herein.

Any network, in particular Internet, browser program can be used. Suitable browser programs include MICROSOFT™ Internet Explorer, NETSCAPE™ browser, AMERICA ONLINE™ browser, PRODIGY™ browser and other such programs.

Since the BA program may operate through a browser program or interface, it is versatile and can be used in any operating system environment capable of supporting a network browser program.

The memory in which the BA file or web page file is independently stored includes both volatile and non-volatile memory. The files can be stored in the random access memory (RAM), a memory cache, floppy disc, magnetic tape, magnetic storage devices, optical storage devices, DVD, CD, hard drive, ZIP™ DISC and such other memory systems that are commonly used in conjunction with network access and communication systems. The BA file in a user computer is preferably stored in a directory typically determined by the specific browser as a file or cluster of files. The BA file is a cluster of data streams that are formatted in a manner that are commonly used in network communication systems.

It should be noted that as used herein, a network browser session is taken to mean a live connection from an end-user computing device to a communication network, such as a live connection between an end-user computer and Internet server, for the transfer and receipt of information data stream conducted utilizing a software browser program which translates information data streams in different formats into information that can be perceived by an end-user utilizing a computing device. A browser session can comprise one or more windows and, unless otherwise specified, each of the windows is managed independent of the other. A window of a network browser session is taken to mean the ability to split an information data stream display device permitting the display of multiple events simultaneously.

BA pop-up and pop-under windows need not necessarily include all the command options typically found in a browser window. As used herein, a pop-up window refers to a browser window that assumes a secondary hierarchical position in a multi-window browser environment by being placed on top of or in front of a primary browser window, so that it is the primary window that is viewable by the end-user. A pop-under window refers to a browser window that assumes a secondary hierarchical position in a multi-window browser environment by being placed below or behind a primary browser window. A primary window, in a multi-window environment, refers to a browser window which content is intended to be the primary focus of a user's attention as compared to other windows of the multi-window environment. Likewise, a primary frame, in a multi-frame window environment, refers to a browser window frame which content is intended to be the primary focus of a user's attention as compared to other frames of the same window.

Figure 8:
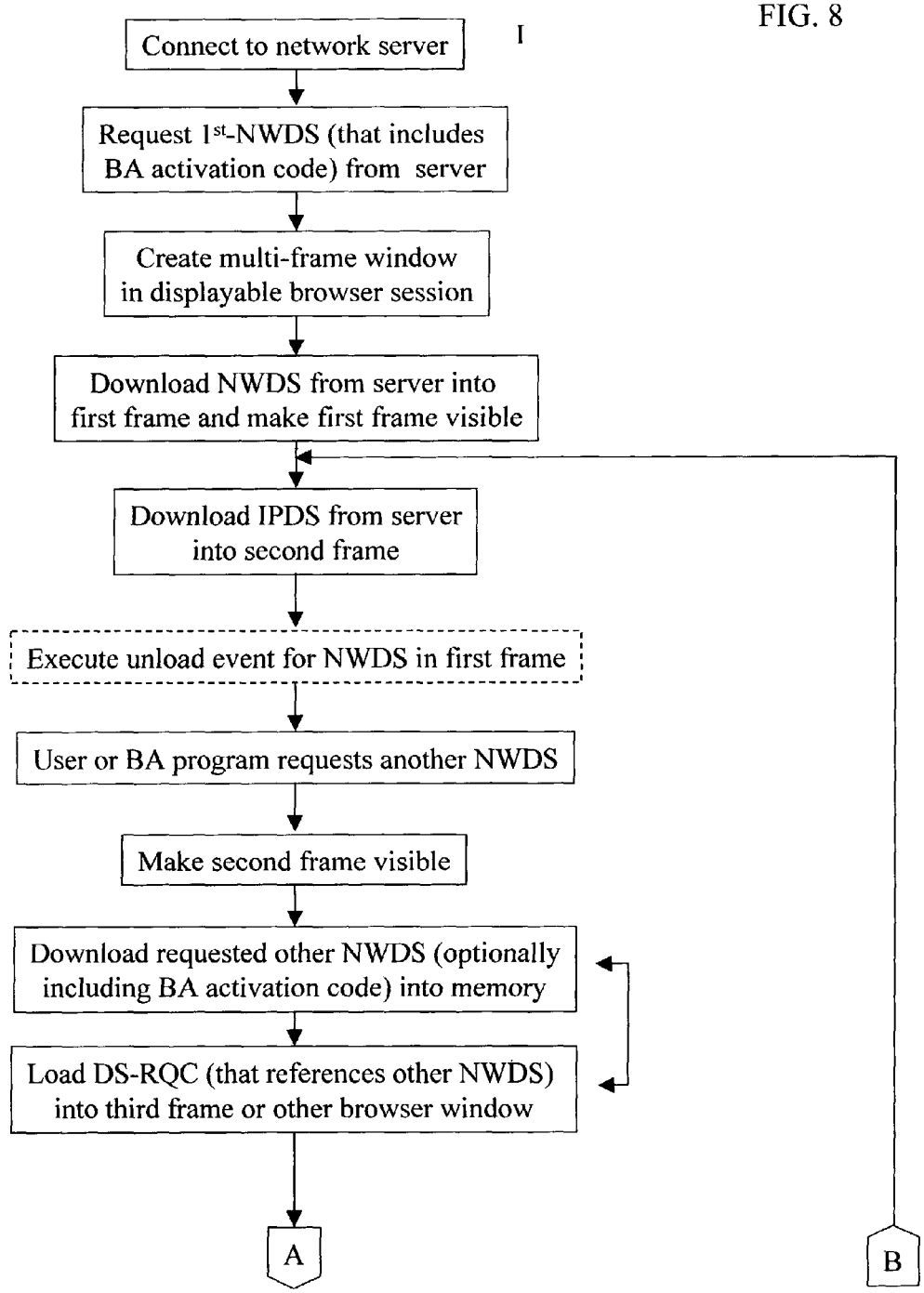
FIG. 8 depicts an exemplary logic flowchart describing some of the functions required by and/or optionally provided with a system and method of the invention employing a multi-frame browser window environment.
Figure 8:
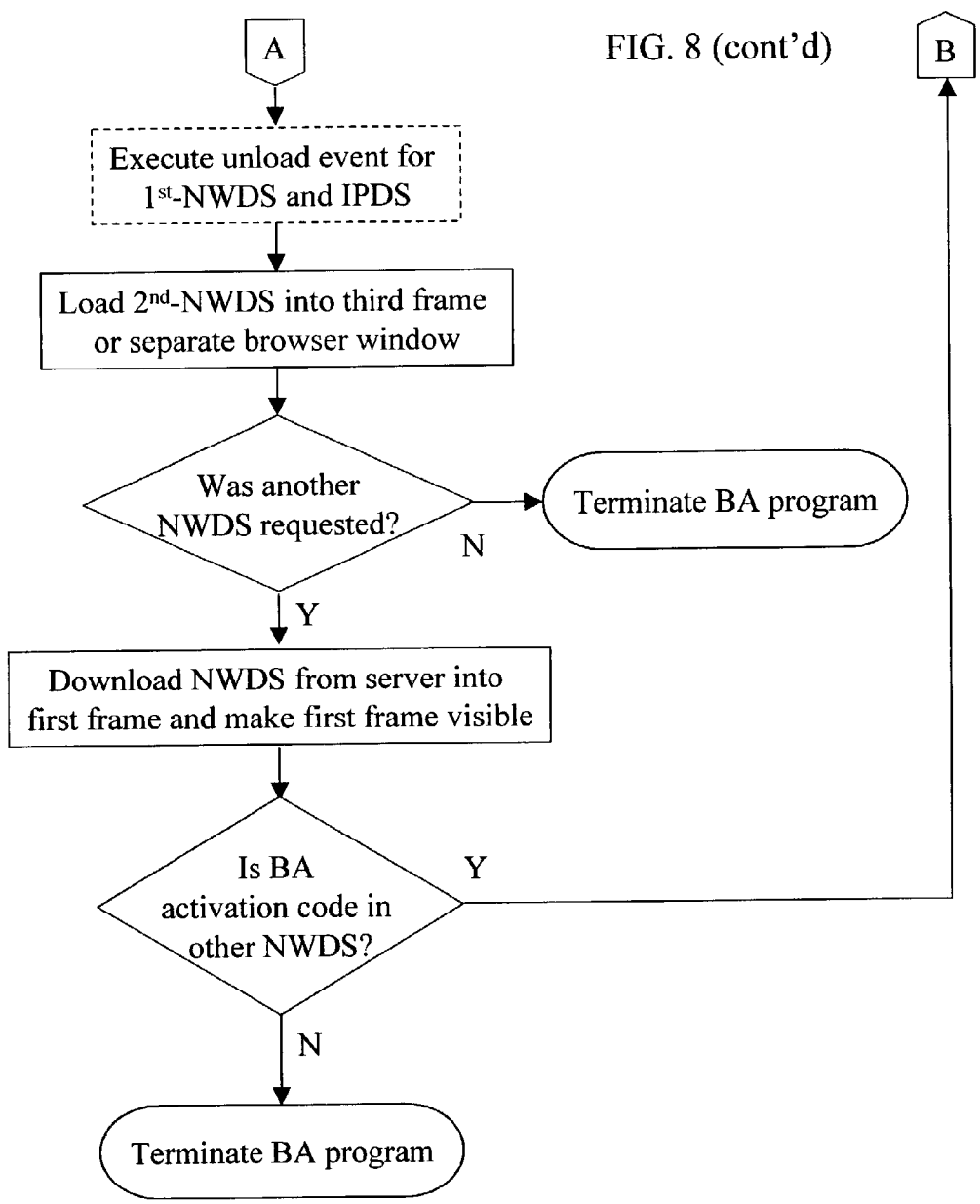

The BA system can be used with a multi-frame window of a browser program. As noted above, the first network data stream ($1^{st}$-NWDS), the information packet data stream (IPDS; a BA file or group of files), and a second network data stream ($2^{nd}$-NWDS) can each occupy a different frame of the same browser window. The BA program can then control when each specific frame is rendered viewable to a user. FIG. 8 depicts a flowchart for some of the steps included in an exemplary embodiment of a BA system that employs a multi-frame window. After a browser program has been launched and a user computer has connected to a network server, a user or the user's computer requests a $1^{st}$-NWDS, which happens to comprise a BA activation code. The browser program then opens or creates a displayable multi-frame window. The $1^{st}$-NWDS is then loaded or downloaded into a first frame of the window. The $1^{st}$-NWDS can have been obtained from the memory of the user computer or from a server to which the user computer is connected. An IPDS is then downloaded or loaded into a second frame of the multi-frame window. The IPDS can have been obtained from the memory of the user computer or from a server to which the user computer is connected. If the IPDS was previously stored in the memory of the user computer from an earlier browser session, then it may be made visible to the user until loading of the $1^{st}$-NWDS into the browser window is complete, at which time the IPDS assumes a secondary position and the $1^{st}$-NWDS is made visible to a user. Otherwise, the IPDS may load into the second frame after the $1^{st}$-NWDS has been loaded into the first frame. The $1^{st}$-NWDS can be visible to the user before or after the IPDS has been made visible. At some point, a request for a $2^{nd}$-NWDS is made by the user or a program, and a data stream request code (DS-RQC) may then be loaded into a third frame of the window. The IPDS (in the second frame) then becomes visible to the user and assumes a primary position in the window, and the first frame assumes a secondary position in the window. The $1^{st}$ NWDS may then be unloaded from the browser program. The DS-RQC is a sub-routine created by the BA program, and its purpose is to act as a placeholder for a data stream, such as a NWDS or IPDS, in a frame until the referenced NWDS or IPDS is to be loaded into the browser and made visible to the user. At that time, the IPDS (and second frame) assumes a secondary position and the $2^{nd}$-NWDS assumes a primary position in the third frame of window. Alternatively, the BA program causes the change of the multi-frame characteristic of the browser session back to a single frame browser session and places the $2^{nd}$-NWDS in the now single frame browser window, i.e., the $2^{nd}$-NWDS becomes visible to the user. The DS-RQC can also be written such that the $2^{nd}$-NWDS will load into a window separate from the multi-frame window, separate frame from the $1^{st}$ and $2^{nd}$ frames of the multi-frame window. Alternatively, the DS-RQC will cause the $1^{st}$-NWDS and IPDS to be unloaded from the browser window and the $2^{nd}$-NWDS to be downloaded from the network server directly into a browser window. If the $2^{nd}$-NWDS also includes a BA activation code, the above-described process can repeat itself when a $3^{rd}$-NWDS is requested. In other words, a second IPDS will be downloaded into the second frame in place of the first IPDS such that when a request for a $3^{rd}$-NWDS is made, the $2^{nd}$-IPDS will be visible to the user until the $3^{rd}$-NWDS is made viewable in a window of the browser program. The multi-frame embodiment of the BA system can be used in combination with the other embodiments of the invention.

Whenever a frame of the multi-frame window assumes a secondary position, after assuming a primary position, its content is optionally unloaded (removed) from the frame. The instruction as to whether or not removal occurs can be included in the BA program, or within code in the $1^{st}$-NWDS, an IPDS, the $2^{nd}$-NWDS or another NWDS. If a NWDS or IPDS contains rich-media content, it is played when its respective data stream is viewable by a user and assumes a primary position in a browser session. For example, any video or audio data that is part of an BA IPDS will be played when the frame or window containing the BA IPDS assumes a primary position in the browser session.

The multi-frame browser window embodiment can be used in providing interstitial advertisements in the case of unknown URL events, as described above, which events occur within the same window of a browser session as that in which the Target Page ($2^{nd}$-NWDS) and Source Page ($1^{st}$-NWDS) are displayed. Under such circumstances, a DS-RQC is specified and is invoked as the Source Page is being erased. The DS-RQC need not know where the browser is going to (it does not need to recognize the URL address of the Target Page). It only needs to recognize that the Source Page is being unloaded from the browser window. This DS-RQC is used to invoke the desired interstitial event, and when the interstitial event is concluded, the browser will proceed to load the Target Page. For example, the DS-RQC can request the download of an IPDS or NWDS into the memory of the computer or directly into a browser window or it can request the loading of an IPDS or NWDS from the memory of the computer into a browser window. Accordingly, the invention provides an interstitial message delivery system comprising a data stream request code that recognizes when a first data stream is being unloaded from a browser window and, in response, requests the downloading or loading of an IPDS or NWDS into a window and/or frame of a browser session.

Figure 9:
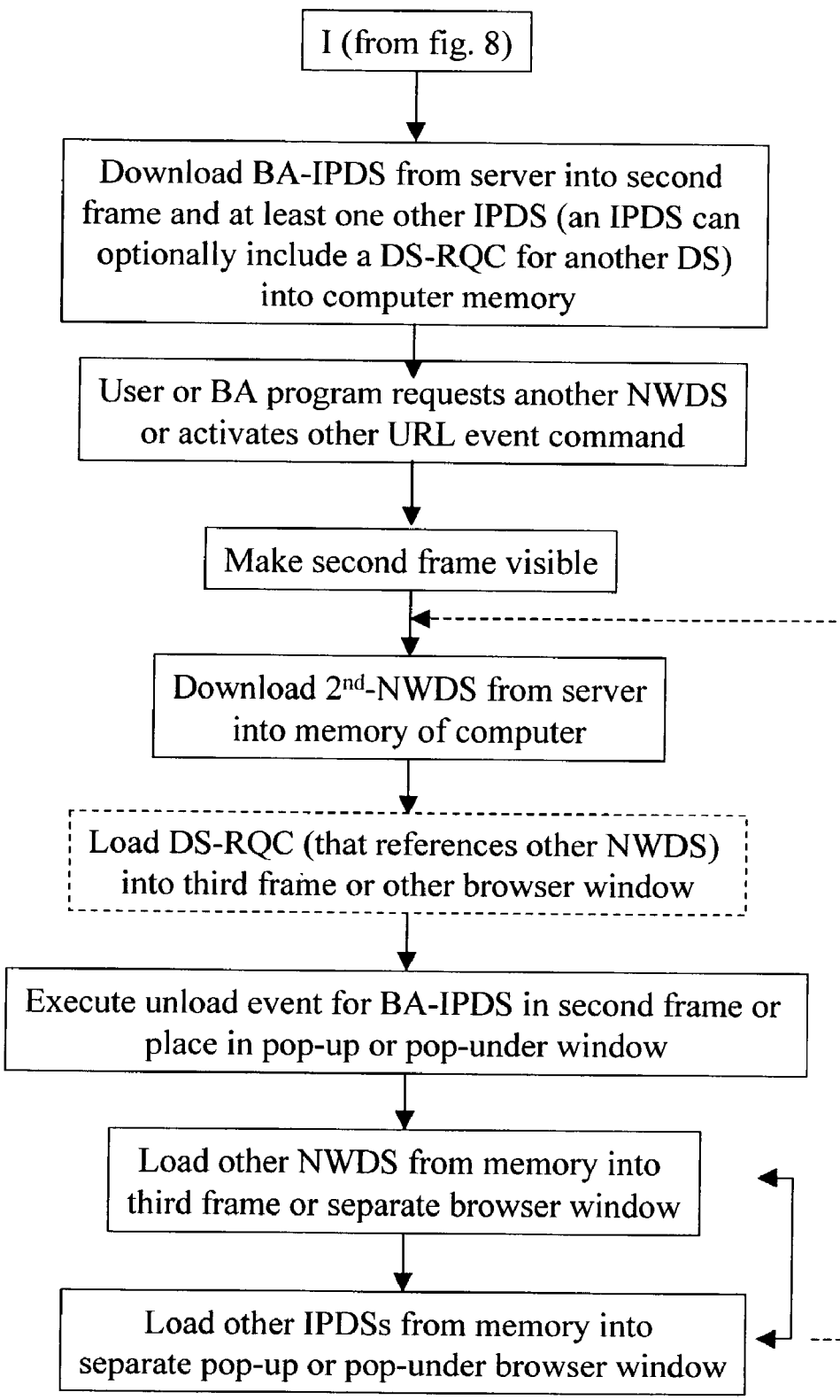
FIG. 9 depicts an alternate embodiment of the system and method of FIG. 8; however, this embodiment employs a BA information packet data stream (IPDS) and at least one other IPDS that is not a banner advertisement according to the invention. This exemplary embodiment also employs pop-up and pop-under browser windows for displaying the other IPDS.

FIG. 9 depicts a flowchart for another embodiment of the multi-frame window system described herein. This embodiment incorporates the same first steps as depicted in the dot-outlined box labeled "I" in FIG. 8. In this case, however, plural IPDSs (plural banner advertisements) are being downloaded and viewed. At least one of the banner advertisements is a BA according to the invention, and the remaining advertisements are according to other advertisement systems and methods known in the art. This embodiment may be useful when a publisher or host of a web page wants to provide a means for correlating the content of the interstitial advertisement with other advertisements that the end-user may be exposed to. As used herein, the term "interconstitial banner advertisement" (ICBA) refers to an IPDS containing at least two different advertisements, wherein at least one of the advertisements is a BA according to the invention. Both advertisements may be downloaded to the end user's computer at a point of time after a source page has downloaded, so as not to interfere with the downloading of the source page. Both the advertisements may be interrelated in their content, in a manner determined by the advertiser/publisher/host, etc. The BA retains its characteristics as described herein. The ICBA, however, may be loaded into the same window as that of a target (requested) web page.

Following or concurrent with the step of loading the $1^{st}$-NWDS into a first browser window, plural IPDSs are downloaded, such that at least one BA according to the invention is downloaded into a second frame of the window and the remaining IPDSs are downloaded into the memory of the computer (See FIG. 9). The BA according to the invention optionally includes a DS-RQC that requests the downloading of the other IPDSs or NWDSs. At some point, a request for a $2^{nd}$-NWDS is made either by the user or the computer. The BA then becomes visible to a user and the $2^{nd}$-NWDS is downloaded into the memory of the computer, into a third frame of the window or into a new window. While the $2^{nd}$-NWDS is being downloaded, the third frame of the multi-frame window or the new window might optionally include a DS-RQC that requests the loading of the $2^{nd}$-NWDS into its window or frame once downloading of the $2^{nd}$-NWDS into the memory of the computer is complete. (See dash-outlined box in FIG. 9.) After its download is complete, the $2^{nd}$-NWDS assumes a primary position in the browser session and becomes visible, and the BA assumes a secondary position (pop-up or pop-under) or is unloaded from its window. (Alternatively, the BA can be unloaded from its window prior to the downloading of the $2^{nd}$-NWDS or prior to loading of the $2^{nd}$ NWDS into the browser session.) The other IPDSs are then loaded into the same window or frame as the $2^{nd}$-NWDS, thereby enabling the advertiser to provide the user with additional exposure to the BA content, or parts thereof. This process can further comprise the step of invoking code to cause the second frame (containing the BA) to become visible. The other IPDSs can instead be loaded into one or more pop-up or pop-under windows that are separate from the window containing the $2^{nd}$-NWDS. As noted in the flowchart, some of the steps are interchangeable. Moreover, some of the steps can occur concurrently.

The invention provides a system and method for the delivery of interstitial advertising in conjunction with the delivery of e-mails, such as HTML formatted files, that are delivered by use of e-mail systems. The system causes the launch of an advertisement upon the occurrence of an unloading event of the e-mail, generally in the same browser session as that in which the e-mail is being viewed. This system and method do not necessarily require the end-user to be browsing the World Wide Web or other network when the ad is delivered or launched. The ad can be delivered to the end user in conjunction with the e-mail (such as in the form of an attachment), or alternatively, a tag can be delivered in conjunction with the e-mail that will cause the downloading of an advertisement, for example in the background while the end-user is reading the e-mail message and launch of the advertisement upon the occurrence of the ad-launching unloading event (whereas this latter methodology will enable the matching of the delivered ad to the specific end user by utilization of standard ad targeting technologies). The present system provides for delivery of an interstitial advertising medium banner which content is clearly distinguishable from the content of the originating e-mail. The ad of the invention is viewed upon the event that effectively unloads the e-mail, such as closing the e-mail, clicking on a link that will transfer the user to a targeted web page, or selecting a second email message to be read. The BA is viewed during the time period in which content of the originating e-mail is being effectively removed from view by the user or is undergoing another unloading event. The advertisement is downloaded a first time onto and stored in the memory of the user computer. This download occurs in conjunction with the downloading of an e-mail message, either as an attachment to the e-mail, or as a result of activation of a command that is integrated into the email, wherein the command causes the downloading of the advertisement while the end user is viewing the originating e-mail message. The BA can be available for viewing immediately after it is first download onto the web user's computer. The system of the invention allows an advertiser to provide a condensed and more appealing message that can integrate concise audio and video presentations utilizing flash technologies, or other such technologies, which presentations are not available in other known banner advertisements typically integrated into HTML formatted e-mail messages.

The claimed email embodiment of the BA system can provide a means for correlating the message conveyed in the interstitial BA with a follow-up conventional content advertisement that appears in the form of a pop-up or pop-under advertisement, in a browser session that is separate from that in which the interstitial advertisement or the e-mail content page is available, or in the form of a banner or other form of advertisement that is integrated into a target web page to which the end-user has requested to be forwarded to from the e-mail. This can be performed by serving-up to the end-user two on-line advertisements. Both advertisements may be downloaded to the end user's computer in conjunction with the e-mail message as attachments, or code integrated into the e-mail can cause their download after the e-mail is launched upon the enduser's computer. Both the advertisements may be related and correlated in their content in a manner determined by the advertiser. By applying this system and method, the end user will receive a preliminary exposure to the message conveyed in the BA and will have the opportunity, when exposed to the secondary Ad, to associate it to the message from the primary BA. A user will thus be less inclined to click out of the secondary Ad, and more inclined to absorb the message conveyed therein, and even respond to the information and data requests provided therein. In essence, the advertiser can provide the end user to an advertisement twice, while likely lessening user resistance when exposed to the data requests in the second ad.

The BA system and method can be incorporated into an email system that is capable of operating at least one of its windows as a browser session. For example, the email program Microsoft Outlook™ (MSOL) is adapted to work with the browser program Microsoft Internet Explorer™ (MSIE) to view HTML files and email messages containing HTML files.

Figure 10A:
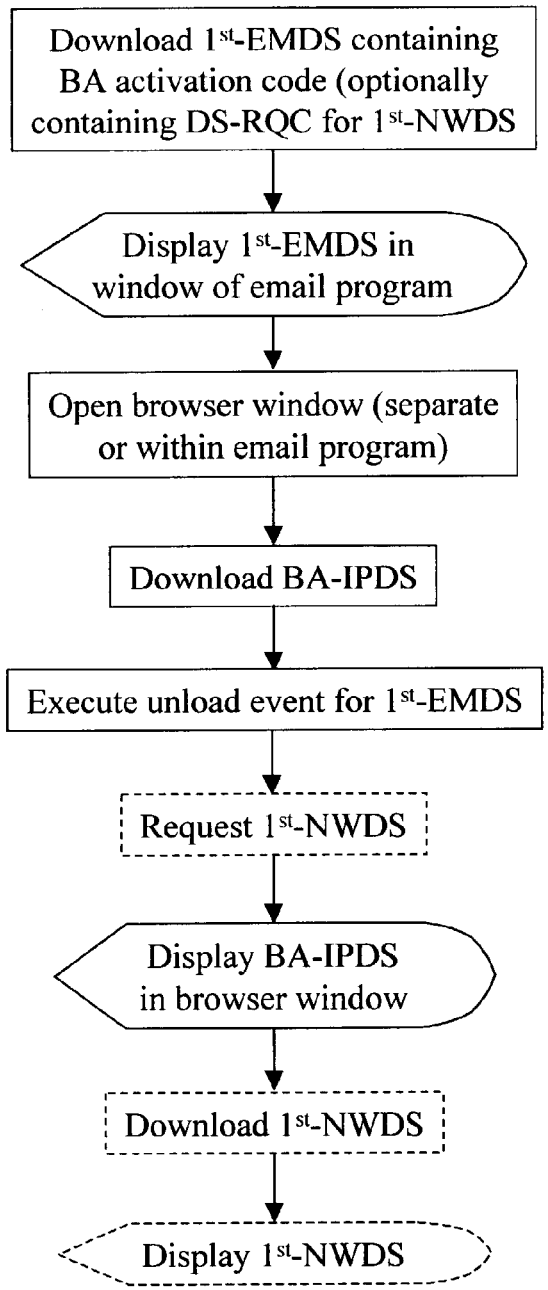
FIGS. 10a-10f depict various embodiments of the invention wherein the BA system and method are integrated into an electronic messaging system.

FIG. 10a depicts one embodiment of the email version of the BA system. An email data stream (EMDS) containing a BA activation code is downloaded into the email program of a computer. The EMDS is displayed and a browser session is initiated within a window of the email program or separately from the e-mail program. If the EMDS is HTML formatted, then the email program will open a browser window within the email environment and display the EMDS in that browser window. Alternatively, the email program or BA program will cause the launch of the browser program so that the browser window opens outside of the email program. A BA file is then downloaded into the memory of the user computer or directly into a browser window (which is either within or outside the email program). The BA program then recognizes a request for an unload event for the $1^{st}$-EMDS. At that point, the BA IPDS assumes a primary position and is displayed in the browser window. The EMDS optionally includes a DS-RQC that requests the download of a $1^{st}$-NWDS (see corresponding dash-outlined box in FIG. 10a). When this DSRQC is present, the $1^{st}$-NWDS is downloaded or loaded into the same browser window, a different browser window or another email program window.

Figure 10B:
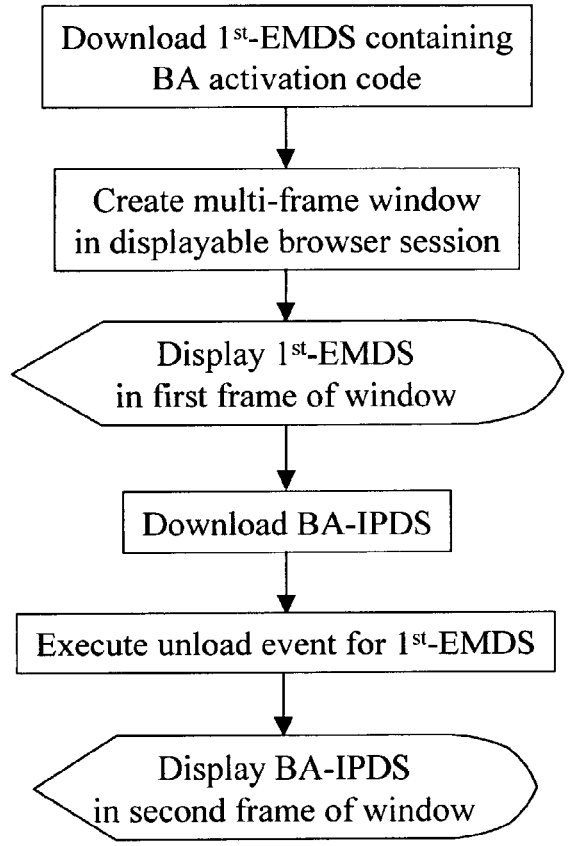

FIG. 10b depicts an alternative multi-frame browser window embodiment of the system of FIG. 10a. After downloading an email message containing a BA activation code, the email program opens/creates a multi-frame browser window. The email message is then loaded into and displayed in a first frame of the browser window. The BA file is then downloaded into the memory of the user computer or into the second frame of the same window. After detecting or recognizing an unload event for the first email message, the BA program causes the display of the BA IPDS in the second frame of the window. If the first EMDS includes a DS-RQC that requests the download of an NWDS, the NWDS is loaded into a frame of the browser window, into a new browser window or into a new email program window.

Figure 10C:
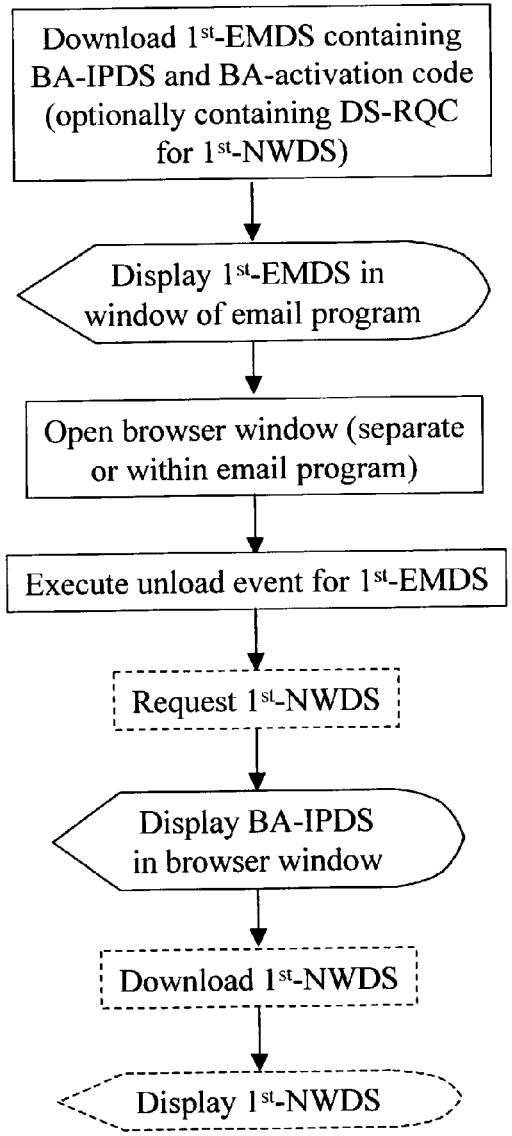

An alternate embodiment of the system of FIG. 10a employs an EMDS having a BA file (IPDS) and BA activation code attached to it. In this embodiment, the step of downloading the BA file is included within the step of downloading the EMDS. FIG. 10c depicts this embodiment in a single frame browser window environment. After downloading of the $1^{st}$-EMDS, BA-IPDS and BA activation code is complete, the $1^{st}$-EMDS is displayed in a browser window operating under the email program. Another browser window that is within or outside the email program is then opened and the BA IPDS is loaded into it. After detecting an unload event, the BA program causes the BA IPDS to become visible. If the unload event is the request of a NWDS, it will be downloaded into the user computer or a browser window and displayed in the browser window.

Figure 10D:
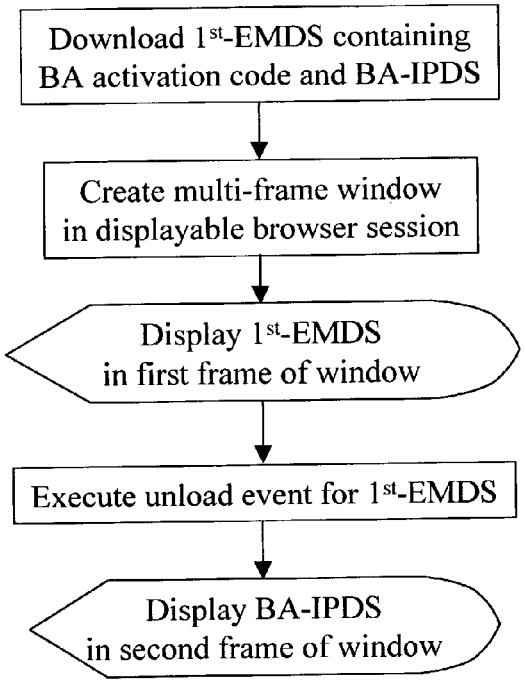

An alternate embodiment of the system of FIG. 10c is depicted in FIG. 10d. This embodiment employs a multi-frame browser window environment as well as a NWDS that includes a BA-IPDS and a BA activation code. After downloading the HTML formatted $1^{st}$-NWDS, a BA-IPDS and a BA activation code, a multi-frame browser window is created and the $1^{st}$-EMDS is displayed in a first frame of the window. After detecting an unload event for the $1^{st}$-EMDS, the BA-IPDS is displayed in a second frame of the same window. The other options detailed in FIGS. 10a-10c can also be included in the system of FIG. 10d.

Figure 10E:
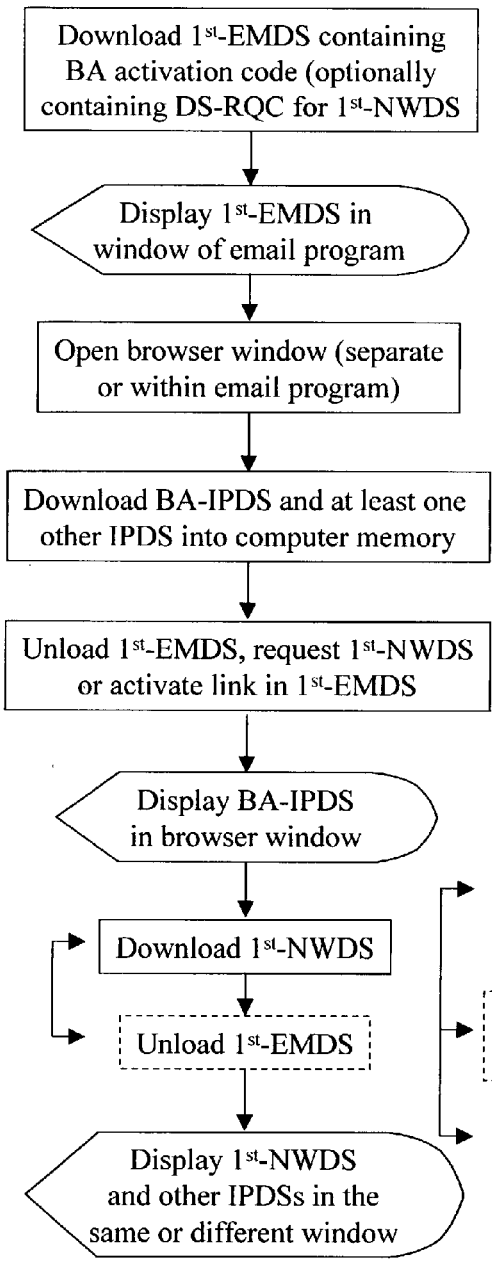

The interconstitial advertisement (an advertisement containing a BA IPDS and another IPDS) described above can also be used in combination with an email system. FIG. 10e depicts some of the steps included in this combination system. A first EMDS containing a BA activation code is downloaded into an email program, and, optionally a DS-RQC referencing a $1^{st}$-NWDS, $2^{nd}$-EMDS, other data stream or unload event may be initiated by the BA code as well. The first EMDS is displayed and a browser session is initiated within a window of the email program. Alternatively, the email program or BA program will cause the launch of the browser program so that the browser window opens outside of the email program. Plural IPDS files, at least one of which is a BA file according to the invention, are then downloaded to the memory of computer. A $2^{nd}$-EMDS or a $1^{st}$-NWDS is requested or a link in the $1^{st}$-EMDS is activated or an unload event for the $1^{st}$-EMDS is executed. The BA file is then loaded into and displayed the browser window. While the other data stream is being downloaded, the BA IPDS remains displayed and any rich media content is also played. After completion of its download, the $2^{nd}$-NWDS is loaded into a browser window, and the first EMDS is optionally unloaded from its window, although it may be retained within the email program. When the $2^{nd}$-NWDS is displayed, one or more of the IPDSs stored in the memory of the computer are displayed with it. The $2^{nd}$-NWDS is loaded into the same browser window or a different browser window.

Figure 10F:
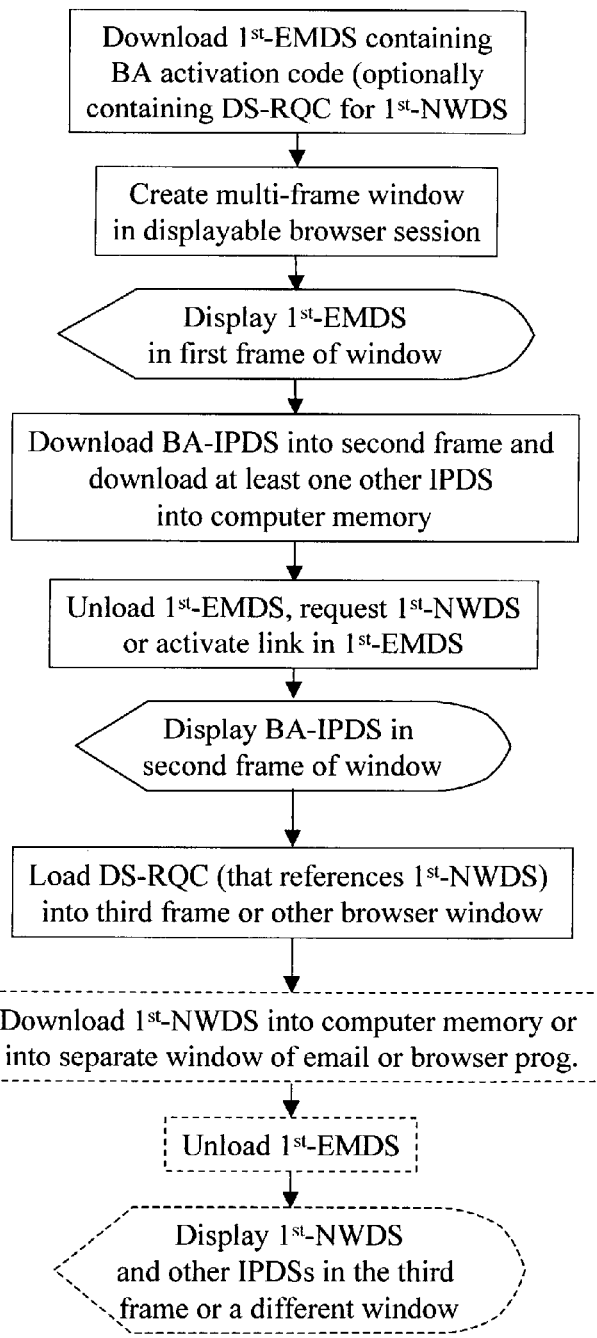

FIG. 10f depicts an alternate multi-frame window embodiment of the system and method of FIG. 10e. A first HTML formatted EMDS containing a BA activation code (and optionally a DS-RQC referencing a $1^{st}$-NWDS, $2^{nd}$-EMDS, other data stream or unload event) is downloaded into and displayed in a multi-frame window of an email program. Plural IPDS files, at least one of which is a BA file according to the invention, are then downloaded. The BA-IPDS is loaded into the second frame of the browser window. A $2^{nd}$-EMDS or a $1^{st}$-NWDS is requested or a link in the $1^{st}$-EMDS is activated or an unload event for the $1^{st}$-EMDS is executed. The BA IPDS is then displayed in the browser window. While the other data stream is being downloaded, the BA IPDS remains displayed and any of its rich media content is also played. After completion of its download into the memory of the computer, the $1^{st}$-NWDS (or other requested data stream) is loaded into the third frame of the browser window. While the $1^{st}$-NWDS is being downloaded, the third frame can comprise a DS-RQC referencing the $1^{st}$-NWDS and requesting that the $1^{st}$-NWDS load into the third frame. The $1^{st}$-EMDS is optionally unloaded from its frame before during or after the download of the $1^{st}$-NWDS. When the $1^{st}$-NWDS is displayed, one or more of the IPDSs stored in the memory of the computer are displayed with it.

Figure 11:
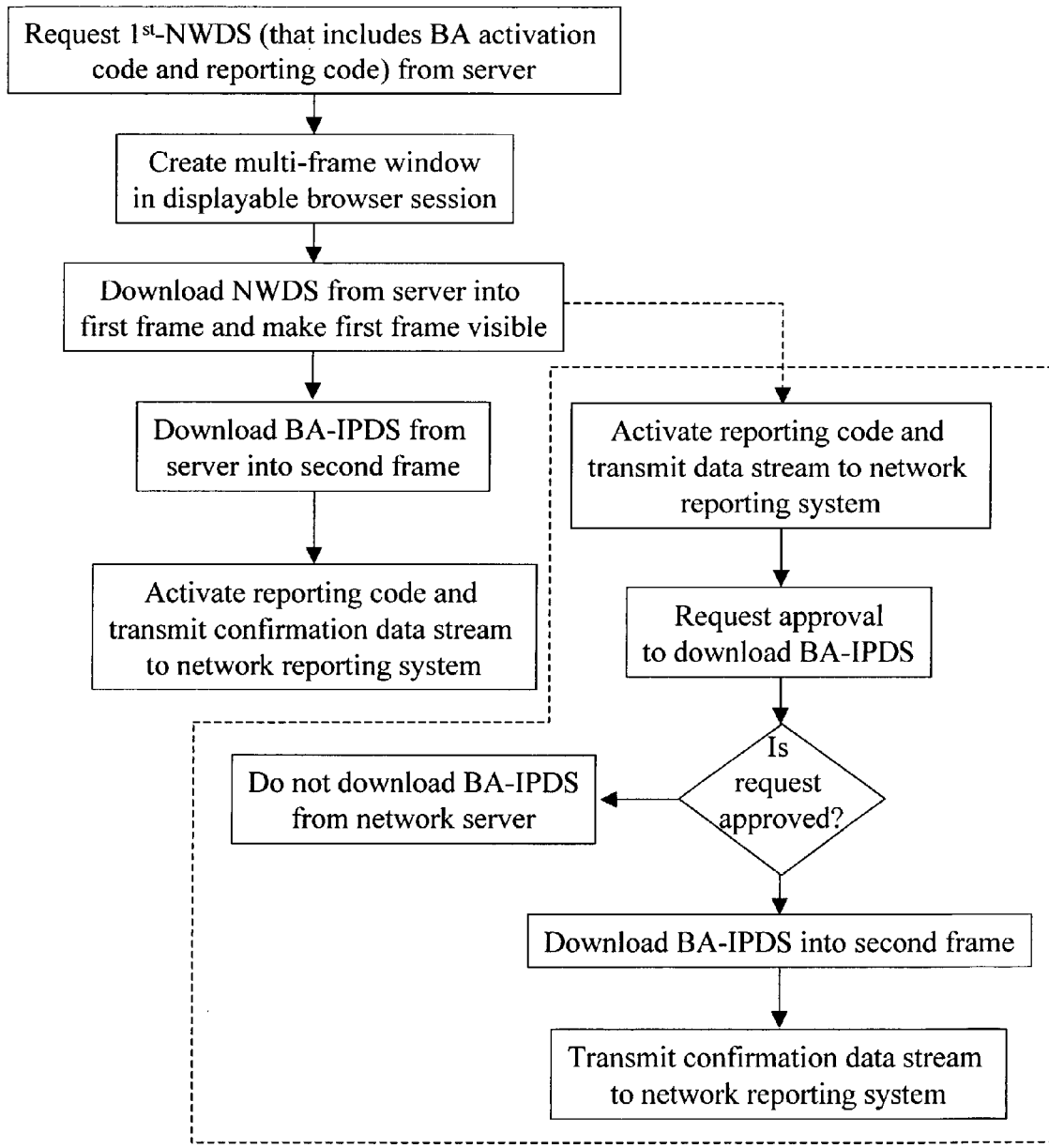
FIG. 11 depicts an embodiment of the invention that provides a delivery confirmation system and method such that a publisher, owner, provider or other third party can obtain confirmation that a BA IPDS was downloaded to a user computer. Alternatively, the delivery confirmation system also includes a delivery request approval routine by way of which a publisher, owner, provider or other third party can approve or deny delivery of a BA IPDS to a user computer.

FIG. 11 depicts two alternate embodiments of a BA system that includes a delivery confirmation message. During a browser session a $1^{st}$-NWDS, which happens to include a BA activation code and a reporting code, is requested from a server. The browser program creates a multi-frame window, if one is not already open, and the NWDS is downloaded into and displayed in a first frame of the window. A BA-IPDS is then downloaded into the second frame of the window. In response to the downloading of the BA-IPDS, a reporting code is activated and a delivery confirmation data stream is sent to a network reporting system, thereby confirming delivery of the BA-IPDS to the end-computer. The BA-IPDS reporting code may be activated also in a single frame environment, where an advertisement is loaded into the browser window, and is made viewable by the end-user. As used herein, a reporting code is a software routine, function or series of functions that is adapted to forward a defined data-stream of information to a network reporting system enabling the compilation and reporting of that information. In this embodiment, the reporting code is included with the $1^{st}$-NWDS; however, it can also or alternatively be included with the BA-IPDS. As used herein, a delivery confirmation data stream in a data stream created by the reporting code and sent to a network reporting system. Receipt of the confirmation data stream by the network reporting system provides confirmation that the BA-IPDS was delivered to the end computer. Depending upon how the delivery confirmation data stream is designed, it can also confirm that the BA-IPDS was also made available for display and/or displayed in a browser window of the end computer. As used herein, a network reporting system comprises a network data-base that provides $3^{rd}$ parties with information regarding the subject matter of the reporting system, such as the number and date/time of advertisement downloads and of advertisement launches—their being made viewable at (on the monitor of, for example) the end-user computer and the IP addresses to which the advertisements were downloaded to.

In the alternate embodiment, which is depicted enclosed in a dash-outlined box in FIG. 11, the reporting code is activated after the NWDS is downloaded from the server into the first frame, but before the BA-IPDS is downloaded. An approval request data stream, requesting permission to download to an end computer a BA-IPDS from a server, is sent to the network reporting system. If the download is approved, the BA-IPDS is loaded into the second frame of the window and a delivery confirmation data stream is sent to the network reporting system. If the download is not approved, not BA-IPDS is downloaded to the end computer. As in the other embodiments of the invention, if a BA-IPDS is downloaded to the end computer, it can be downloaded into the memory of the computer, browser window or a frame of a multi-frame browser window. Display of the BA-IPDS will occur upon activation of a URL event in the window containing the source NWDS ($1^{st}$-NWDS). In this case, the reporting code can be made to send a display confirmation data stream to the network reporting system. It should be noted that the confirmation delivery system of the network reporting system can confirm delivery of any type of data stream to an end computer.

As used herein, a network data stream server (NWDS-SR) is a server that comprises one or more network data streams. An information packet data stream server (IPDS-SR) is a server that comprises one or more information packet data streams. A connectivity server (CON-SR) is a server that provides connectivity of an end computer (user computer) to a network of computer(s) and server(s). A network reporting system server (NWRS-SR) is a server that provides some of the above-described network reporting system functions. A network according to the invention can independently comprise one or more of each of the above-described servers. Connectivity between the components of the network can be established by hardwire and/or wireless systems. One or more of any server can be included within an end computer. Moreover, a single computer server can simultaneously function as one or more different servers as described herein. For example a single computer/server can act as a NWRS-SR, CON-SR, IPDS-SR and/or NWDS-SR. Alternatively, one server can provide two functions and another server optionally provide one or more other functions. Likewise, one server can provide three functions and another server optionally provide one or more other functions. Separation of the various components of the system into separate individual components is unnecessary.

Figure 12A:
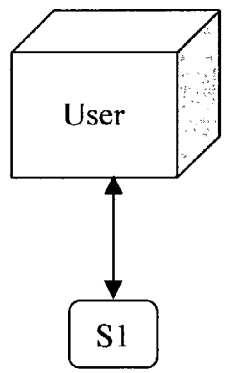
FIGS. 12a-12d depict alternate embodiments of a network suitable for the invention.

FIGS. 12a-12d depict various embodiments of networks that can be used with the system and method of the invention. The arrows indicate exemplary connections between the components of the network; however, any type of connectivity arrangement known in the art of computer networks can be used. In FIG. 12a, the user computer is connected to a single server that functions as the NWDS-SR, IPDS-SR, CON-SR, and optionally the NWRS-SR.

Figure 12B:
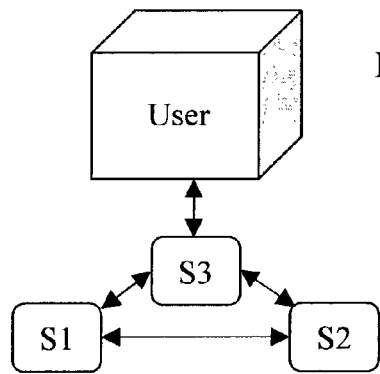

In FIG. 12b, the user computer is connected to a CON-SR (S3), which is connected to two other servers (S1 and S3). The server (S1) functions as the NWDS-SR, and the server (S2) functions as the IPDS-SR. Either server (S1, S2 or S3) can optionally also function as the NWRS-SR. The server (S1) is optionally also connected to the server (S2).

Figure 12C:
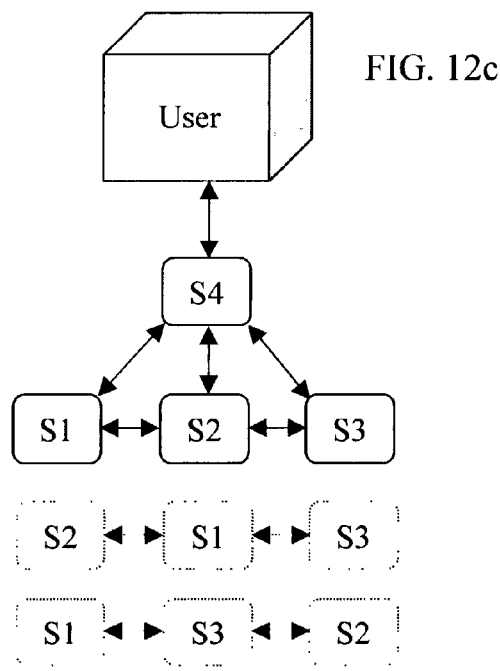

In FIG. 12c, the user computer is connected to a CON-SR (S4), which is connected to three other servers (S1, S2 and S3). The server (S1) functions as the NWDS-SR, the server (S2) functions as the IPDS-SR and the server (S3) functions as the NWRS-SR. The server (S2) is optionally also connected to the server (S1) and the server (S3). Alternatively, the server (S3) is optionally also connected to the server (S1) and the server (S2) (see dashed lines). Alternatively, the server (S1) is optionally also connected to the server (S2) and the server (S3) (see dashed lines).

Figure 12D:
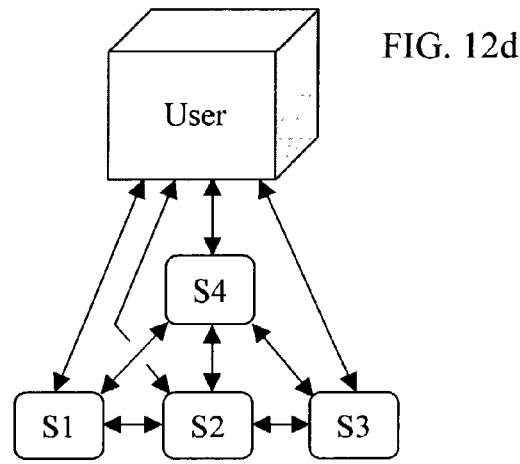

In FIG. 12d, the user computer is connected to a CON-SR (S4), which is connected to three other servers (S1, S2 and S3). However, the user computer is also directly connected to each of the other servers (S1, S2 and S3). The server (S1) functions as the NWDS-SR, the server (S2) functions as the IPDS-SR and the server (S3) functions as the NWRS-SR.

A network comprising an IPDS confirmation delivery system can comprise a first server comprising plural IPDSs, a second server comprising a network reporting system and at least one end computer to which an IPDS is delivered and for which confirmation of delivery is provided. Alternatively, the network comprises a first server comprising plural IPDSs and a network reporting system, and at least one end computer to which an IPDS is delivered and for which confirmation of delivery is provided. The network can comprise a connectivity server by way of which the end computer connects to the network. The connectivity server can also connect to either one or both of the above-described first and second servers.

As used herein, the term downloading generally refers to the process of reading a data stream from a network server into a browser window or into the memory of the computer. The term loading generally refers to the process of reading a data stream from the memory of the computer into a browser window.

The above is a detailed description of particular embodiments of the invention. It is recognized that departures from the disclosed embodiments may be made within the scope of the invention and that obvious modifications will occur to a person skilled in the art. Those of skill in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

We claim:

1. A method of providing to an information packet data stream distributor assurance that an information packet data stream is downloaded subject to pre-authorized criteria and confirmation that the information packet data stream has been loaded into an end computer connected to a network, comprising:
    a) requesting a first network data stream for display in a network browser session, wherein the first data stream comprises activation code for requesting the download of an information packet data stream independent of the first network data stream and reporting code for sending at least one of an approval request data stream and a delivery confirmation data stream to a network reporting system;
    b) creating a multi-frame window in a displayable browser session;
    c) loading the first network data stream into a first frame of the multi-frame window;
    d) activating the reporting code and transmitting an approval request data stream to the network reporting system;
    e) obtaining approval from the network reporting system to download an information packet data stream;
    f) activating the activation code;
    g) downloading the information packet data stream into a second frame of the multi-frame window; and
    h) transmitting a delivery confirmation data stream to the network reporting system, the delivery confirmation data stream providing a confirmation that the information packet data stream is loaded into the browser window.

2. The method of claim 1, further comprising displaying the information packet data stream after activation of a URL event.

3. The method of claim 2 further comprising sending a display confirmation data stream to the network reporting system.

4. The method of claim 3, wherein the display confirmation data stream is transmitted to the network reporting system responsive to displaying the second frame of the multi-frame window to the end-user to confirm that the information data stream was made available for viewing by the end-user.

5. The method of claim 1, wherein the reporting code includes data identifying at least one of the first network data stream and the information packet data stream.

* * * * *

UNITED STATES PATENT AND TRADEMARK OFFICE
CERTIFICATE OF CORRECTION

| | | |
|---|---|---|
| PATENT NO. | : 8,135,620 B2 | Page 1 of 1 |
| APPLICATION NO. | : 10/113114 | |
| DATED | : March 13, 2012 | |
| INVENTOR(S) | : Barsade et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3689 days.

Signed and Sealed this
Twenty-fourth Day of July, 2012

David J. Kappos
*Director of the United States Patent and Trademark Office*